US006967276B2

(12) United States Patent
Futamase et al.

(10) Patent No.: US 6,967,276 B2
(45) Date of Patent: Nov. 22, 2005

(54) PORTABLE TELEPHONY APPARATUS WITH MUSIC TONE GENERATOR

(75) Inventors: Tsuyoshi Futamase, Hamamatsu (JP); Yasushi Kurakake, Hamamatsu (JP); Kensuke Ide, Hamamatsu (JP); Shigehiko Mizuno, Hamamatsu (JP); Shuzo Karakawa, Hamamatsu (JP); Kosei Terada, Hamamatsu (JP); Yutaka Hasegawa, Hamamatsu (JP); Takashi Kunii, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 217 days.

(21) Appl. No.: 10/410,796

(22) Filed: Apr. 10, 2003

(65) Prior Publication Data

US 2004/0007120 A1 Jan. 15, 2004

Related U.S. Application Data

(62) Division of application No. 09/626,304, filed on Jul. 26, 2000, now Pat. No. 6,911,592.

(30) Foreign Application Priority Data

| Jul. 28, 1999 | (JP) | ................................. 11-214083 |
| Nov. 1, 1999 | (JP) | ................................. 11-310750 |
| Nov. 4, 1999 | (JP) | ................................. 11-314396 |
| Jun. 15, 2000 | (JP) | ............................. 2000-179962 |

(51) Int. Cl.$^7$ ............................. G10H 1/06; G10H 7/00
(52) U.S. Cl. ........................ 84/622; 84/645; 434/307 A
(58) Field of Search .......................... 84/609, 615, 622, 84/645; 434/307 A

(56) References Cited

U.S. PATENT DOCUMENTS 5,563,359 A * 10/1996 Okamura ..................... 84/600

| 5,768,127 A | 6/1998 | Murata |
| 5,808,224 A | 9/1998 | Kato |
| 5,831,192 A * | 11/1998 | Watari et al. .................. 84/600 |
| 5,892,171 A * | 4/1999 | Ide .............................. 84/622 |
| 5,914,941 A | 6/1999 | Janky |
| 6,018,654 A * | 1/2000 | Valentine et al. ......... 455/414.4 |
| 6,025,553 A | 2/2000 | Lee |

(Continued)

FOREIGN PATENT DOCUMENTS

EP 0 675 666 A1 10/1995

(Continued)

OTHER PUBLICATIONS

"Handsets in Europe Strike a New Chord as Pop Music Replaces Beeps", Washington Post, Apr. 20, 2001.

(Continued)

Primary Examiner—Jeffrey W Donels
(74) Attorney, Agent, or Firm—Morrison & Foerster LLP

(57) ABSTRACT

A sound control apparatus is provided in a portable terminal for sounding a music tone in association with operation of the portable terminal, which is controlled by a main CPU. In the sound control apparatus, a memory memorizes music information representing a music tone and configuration information associated to a timbre of the music tone. An information acquiring section acquires the music information and the configuration information from the memory. A tone generating section is configured by the acquired configuration information to create a timbre specified by the configuration information. The tone generating section operates according to the acquired music information to generate the music tone being represented by the music information and having the specified timbre. A dedicated CPU is provided separately from the main CPU for controlling the memory, the information acquiring section and the tone generating section.

35 Claims, 26 Drawing Sheets

U.S. PATENT DOCUMENTS

| | | | |
|---|---|---|---|
| 6,034,314 A * | 3/2000 | Koike | 84/600 |
| 6,083,009 A | 7/2000 | Kim et al. | |
| 6,094,587 A * | 7/2000 | Armanto et al. | 455/567 |
| 6,167,253 A | 12/2000 | Farris et al. | |
| 6,184,454 B1 | 2/2001 | Imai et al. | |
| 6,236,832 B1 | 5/2001 | Ito | |
| 6,272,575 B1 | 8/2001 | Rajchel | |
| 6,308,086 B1 | 10/2001 | Yoshino | |
| 6,366,791 B1 | 4/2002 | Lin et al. | |
| 6,501,967 B1 * | 12/2002 | Makela et al. | 455/567 |

FOREIGN PATENT DOCUMENTS

| | | |
|---|---|---|
| EP | 0 806 758 A1 | 11/1997 |
| JP | 57188150 A | 11/1982 |
| JP | 04-3353 | 2/1992 |
| JP | 4168493 | 6/1992 |
| JP | 5232948 | 9/1993 |
| JP | A 7-016481 | 3/1995 |
| JP | 10124046 | 5/1998 |
| JP | 10271245 | 9/1998 |
| JP | 11-112615 | 4/1999 |
| JP | 11103332 | 4/1999 |
| JP | 11-164058 | 6/1999 |
| JP | 11164058 | 6/1999 |
| JP | A 11-164058 | 6/1999 |
| JP | 11225189 | 8/1999 |
| JP | A 11-242490 | 9/1999 |
| JP | A 11-252651 | 9/1999 |
| JP | 2000-81881 | 3/2000 |
| WO | WO 01/16931 A1 | 3/2001 |

OTHER PUBLICATIONS

"The Future of Ringtones", About.com, 2001.

"From I-mode to 3G: Japan's Opportunity to Bounce Back?", IDATE News, Jul. 24, 2001.

"Pocket Monster", WIRED, Sep. 9, 2001.

Yamaha news release, Yamaha Sound Generator LSI "YMU757" (English and Japanese text), Sep. 1999.

* cited by examiner

PORTABLE TELEPHONY APPARATUS WITH MUSIC TONE GENERATOR

This application is a division of application Ser. No. 09/626,304, filed on Jul. 26, 2000 now U.S. Pat. No. 6,911,592.

BACKGROUND OF THE INVENTION

The present invention generally relates to a sounding control apparatus, and a portable terminal apparatus and a system that use this sounding control apparatus. More particularly, the present invention relates to sounding control apparatus built in a portable terminal apparatus such as a portable telephone terminal, and a base station having a database system for providing various pieces of information such as music information to this sounding control apparatus.

Recently developed portable telephone terminals have a capability of sounding a melodious ringing tone to notify call termination on them. This ringing melody is a sequence of monotones based on buzzer sound. The sound information for use in creating the melodious ringing tone can be downloaded from a base station for example.

However, melodious tone reproducing devices such as mentioned as for use in conventional portable telephone terminals can neither reproduce music that sounds two or more tones at a time nor allow various settings such as timbre and effect. Namely, the conventional melody tone reproducing devices cannot reproduce various kinds of music for user enjoyment.

SUMMARY OF THE INVENTION

It is therefore a main object of the present invention to provide a sounding control apparatus that facilitates the setting, editing, and creating of music tone information such as timbre and effect for producing a melody sound at call termination or background music (BGM) during talking by sounding two or more tones at a time by use of an FM tone generator for example in a portable terminal device. So constituted, the sounding control apparatus according to the invention can realize the reproduction of rich and various sounds adapted to the processing capacity of portable terminals and user preferences.

It is another object of the present invention to provide a portable terminal apparatus that provides various operating modes in which audio and video signals are used along with reproduced tones for user enjoyment.

It is a further object of the present invention to provide a portable terminal apparatus that can provide a Karaoke play by synchronously treating music performance and words display.

It is a still further object of the present invention to provide a potable terminal apparatus, a music tone information service system and a base station, in which the potable terminal apparatus is capable of mounting a detachable recording medium that can realize various kinds of music data processing capabilities such as a change in tempo, automatic composition, voice-pitch detection, chord detection, style reproduction, format conversion of music information, and trial listening of music information.

In carrying out the invention and according to a first aspect thereof, there is provided a sounding control apparatus for use in a portable terminal apparatus capable of sounding a music tone, comprising: an information acquiring means or section for acquiring performance information and timbre-associated configuration information and effect-associated configuration information; given a timbre set on the basis of the timbre-associated configuration information, a tone generating means or section for generating a tone signal corresponding to the performance information; an effect imparting means or effector section for imparting an effect set on the basis of the effect-associated configuration information to the generated tone signal, and an output means or section for outputting the tone signal imparted with the effect.

In carrying out the invention and according to a second aspect thereof, there is provided a sounding control apparatus for use in a portable terminal apparatus capable of sounding a tone, comprising: a storage means or memory section for storing music tone information; a tone generating means for generating, on the basis of the music tone information stored in the storage means, a tone signal having a predetermined timbre and imparted with a predetermined effect; and a control means for controlling the storage means and the tone generating means independently of the portable terminal apparatus.

In carrying out the invention and according to a third aspect thereof, there is provided a portable terminal apparatus comprising: a storage means for storing music tone information, audio information, and video information; a sounding control apparatus for generating, on the basis of the music tone information stored in the storage means, a tone signal given with a predetermined timbre and/or a predetermined effect corresponding to configuration information included in the music tone information; and a means for generating, on the basis of the audio information and the video information stored in the storage means, an audio signal and a video signal. The music tone information stored in the storage means is presented in a format which is downsized as compared with a general-purpose music tone information format in correspondence with a storage size of the storage means.

In carrying out the invention and according to a fourth aspect thereof, there is provided a music tone information service system composed of a portable terminal apparatus capable of sounding a tone and a base station having a music tone information source, comprising: an information selecting means or section for selecting, according to selecting information sent from the portable terminal apparatus, corresponding music tone information from the music tone information source; configuration information attaching means or section for attaching, to the selected music tone information, configuration information indicative of a timbre and an effect to be given to the tone sounded in the portable terminal apparatus; and a sounding control apparatus for generating, on the basis of the music tone information attached with the configuration information, a tone signal given with a predetermined timbre and/or a predetermined effect. This music tone information service system further comprising: a charging means or section for executing a charging operation on the portable terminal apparatus which sent the selecting information.

In carrying out the invention and according to a fifth aspect thereof, there is provided a music tone information service system composed of a portable terminal apparatus capable of sounding a tone and a music tone information processing apparatus capable of creating or editing music tone information, comprising: an information compressing means or section for compressing the created or edited music tone information; and a sounding control apparatus for generating, on the basis of the compressed music tone information, a tone signal given with a predetermined timbre and/or a predetermined effect.

In carrying out the invention and according to a sixth aspect thereof, there is provided a music tone information service system composed of a portable terminal apparatus capable of sounding a tone and a music tone information source which stores music tone information, comprising: an information acquiring or capturing means or section for acquiring or capturing the music tone information stored in the music tone information source into the portable terminal apparatus; an information editing means or section for editing the captured music tone information; and a sounding control apparatus for generating, on the basis of the edited music tone information, a tone signal given with a predetermined timbre and/or a predetermined effect.

In a seventh aspect of the invention, there is provided a portable terminal apparatus comprising a memory means for memorizing performance information and words information corresponding to progression of a performance, a tone generation control device operative based on the memorized performance information for sequentially generating a music tone signal, and a display means operative based on the memorized words information for generating a words display signal corresponding to the generated music tone signal. Further, there is provided a portable terminal apparatus comprising a memory means for memorizing first performance information, second performance information, and words information corresponding to performance progression of the second performance information, a tone generation control device operative based on the first performance information and the second performance information for generating a first music tone signal and a second music tone signal, respectively, a display means operative based on the words information for generating a words display signal corresponding to the second music tone signal, and a control means for controlling the tone generation control device to generate the first music tone signal in precedence to generation of the second music tone signal.

According to the first aspect of the invention, a portable terminal apparatus capable of sounding tones has a sounding control apparatus that is given a timbre to be set on the basis of timbre-associated configuration information to generate a tone signal corresponding to performance information and to impart an effect to be set on the basis of effect-associated configuration information to the generated tone signal. Consequently, two or more tones can be sounded at a time by use of an FM tone generator for example, thereby providing rich and various ringing melodies, BGM during talking, and music at any time desired.

According to the second aspect of the invention, the control means (CPU), which operates independently of the portable terminal apparatus, is used to generate a tone signal having a predetermined timbre and imparted with a predetermined effect. Consequently, tone signal generation processing can be executed with relatively high degree of freedom without being restricted by the control of the portable terminal apparatus main.

According to the third aspect of the invention, a tone signal imparted with a predetermined timbre and/or effect corresponding to configuration information included in music tone information is generated on the basis of the music tone information and, at the same time, an audio signal and a video signal are generated on the basis of audio information and video information. Consequently, the user can enjoy the reproduced tone in various modes supported by the audio and video signals. In addition, according to the storage size of the storage means used, tone signals are generated by use of music tone information presented in a format which is downsized as compared with a general-purpose music tone information format. Consequently, quality tones can be reproduced within the maximum allowable range of the data processing and storage capacities of the portable terminal apparatus without weighing upon the memory of the apparatus.

According to the fourth aspect of the invention, a music tone information service system is formed by portable terminal apparatuses and the base station (server), having a music tone information source. According to the selection information sent from any of the portable terminal apparatus, the base station selects corresponding music tone information from the music tone information. source. The base station creates configuration information indicative of a timbre and/or an effect to be imparted to a tone which is sounded in the portable terminal apparatus. On the basis of the music tone information attached with the created configuration information, the portable terminal apparatus generates a tone signal imparted with the predetermined timbre and/or effect. Consequently, rich and divergent tones can be provided by effective use of the server database. In addition, the charging processing is executed to the portable terminal apparatus that sent the selection information, thereby providing appropriate services to the users of particular portable terminal apparatus.

According to the fifth aspect of the invention, music tone information is shared by a music tone information processing apparatus based on a personal computer or an intelligent electronic musical instrument. Music tone information of a desired format is created or edited in the music tone information processing apparatus to compress the created or edited music tone information into a size suitable for the portable terminal apparatus. Therefore, the novel constitution facilitates the setting, editing, and creation of timbres and effect of the music tone information suitable for the capacity of the portable terminal apparatus.

According to the sixth aspect of the invention, music tone information stored in music tone information sources such as external recording media and telephone terminals is captured in the portable terminal apparatus for editing. Consequently, music tone information of various forms can be processed into the music tone information suitable for the capacity of the portable terminal apparatus or user preferences.

To sum up, according to the present invention, a tone generator capable of sounding two or more tones at a time is arranged in a sounding control apparatus in a portable terminal apparatus to impart a timbre and an effect for example to a generated tone on the basis of configuration information associated with tone sounding. This novel constitution reproduces music, which is various in kind and rich in musicality as ringing melodies, BGM sounded during talking, and music, which entertains the user as desired. In the present invention, each piece of information including music tone information can be captured any time from external information sources such as base station, personal computer, other telephone terminals, and small-size or compact storage media, which enhances system extensibility, thereby reproducing a wide range of a variety of music as ringing melodies and BGM for example.

In addition, according to the present invention, the music information to be captured in the portable terminal apparatus is attached with configuration information associated with tone sounding, compressed by deleting unnecessary information so as to fit the storage size of the terminal apparatus, and format-converted so as to match in the own model of the terminal apparatus concerned, thereby enhancing system extensibility still further. Besides, use of an editing means facilitates the acquisition of the music tone information attached with configuration information while downsizing the amount of the information.

According to the seventh feature of the invention, the performance information and the words information corresponding to progression of the music performance are memorized. The music tone signal is sequentially generated according to the performance information, while the words display signal corresponding to the generated music tone signal is generated according to the words information. Thus, the portable terminal apparatus such as a portable telephone can provide a Karaoke play. The inventive apparatus can be efficiently used for Karaoke training by displaying and memorizing Karaoke words in a spare time. According to this feature, there are treated first performance information, second performance information and words information corresponding to the performance progression of the second performance information. A second music tone signal is generated according to the second performance information, and a words display signal corresponding to the second music tone signal is generated according to the words information, thereby enabling Karaoke play. Further, the first music tone signal is generated according to the first performance information in precedence to the Karaoke play, thereby enabling automatic switch from the Karaoke play to the reproduction of a ringing melody according to the first music tone signal, while the words display may not disturb telephone conversation.

In addition, according to a specific aspect of the invention, being associated with editing performance information, there is provided a potable terminal apparatus that comprises a storage means for storing performance information, a means for displaying parameters in the performance information stored in the storage means, and a means for editing the parameters displayed. The portable terminal apparatus can display one of parameters in the stored performance information which the user wishes to edit, so that the user can operate ten keys for telephone number entry to input a parameter value, thus editing the performance information.

In carrying out the invention and according to an aspect of changing the tempo of music information, there is provided a portable terminal apparatus that comprises a storage means for storing music information, a tempo specifying means or section for specifying a tempo, and a control means for controlling, according to the tempo specified by the tempo specifying means, the tempo of a tone to be. sounded on the basis of the music information stored in the storage means. The portable terminal apparatus allows the user to specify a tempo by use of at least one of parameters. The parameters include an absolute value of the tempo (a numerical value), a word indicative of the tempo (such as "allegro" and "moderato"), a rate of change from a reference tempo (% or ±), and an intuitive word ("quick", "slow" or "moderate"). Thus, the user can use an operator of the portable terminal apparatus (main unit) to specify a tempo so as to control the performance tempo of sounding music such as a ringing melody or BGM.

In carrying out the invention and according to an aspect of automatic composition, there are provided a potable terminal apparatus that comprises a means for setting an atmosphere of music, and a means for automatically creating music information according to the set atmosphere, and another portable terminal apparatus that comprises a means for inputting a part of music data, and a means for automatically creating a whole of music information for a complete piece of music from the part of music data. The former terminal apparatus allows the user to use an operator to selectively set an atmosphere of music so as to automatically create music information. The latter terminal apparatus allows the user to input the part of music data so as to automatically create music information for a piece of music from the partial data.

In carrying out the invention and according to an aspect of pitch detection, there are provided a portable terminal apparatus that comprises a means for selectively acquiring either tone signals input from a microphone or tone signals received at a transmitting/receiving circuit, a means for extracting a pitch sequence from the acquired tone signals, and a means for creating music information on the basis of the pitch sequence extracted, and another portable terminal apparatus that comprises a means for acquiring a tone signal, and a means for extracting a pitch sequence from the acquired tone signals, a means for transposing the pitch sequence extracted, and a means for creating music information on the basis of the pitch sequence transposed. In these portable terminal apparatuses, when a pitch sequence is extracted from an input tone, the former terminal apparatus can arbitrarily select either a tone input from a microphone or a tone input during talking, while the latter terminal apparatus can transpose the detected pitch sequence as required.

In carrying out the invention and according to an aspect of chord detection, there is provided a portable terminal apparatus that comprises a storage means for storing music information, a music analyzing means for analyzing the music information stored in the storage means, and a means for automatically creating, on the basis of the analysis result by the music analyzing means, performance information associated with a chord fitting the music information. The portable terminal apparatus can automatically create performance information associated with the chord fitting the music information.

In carrying out the invention and according to an aspect of style reproduction, there is provided a portable terminal apparatus that comprises a storage means for storing plural kinds of style information, and a means for joining the style information stored in the storage means to create music information. The portable terminal apparatus can store plural kinds of style information and performance information and join them to reproduce a piece of music.

In carrying out the invention and according to an aspect of format conversion, there are provided a music information service system, composed of a potable terminal apparatus that performs a tone process using music information of a first format and a base station having a music tone information source, wherein the base station comprises a format converting means for converting music information of a format different from the first format into music information of the first format, and a base station capable of distributing music information from a music information source to a potable terminal apparatus that performs the tone process using music information of a first format, which comprises a format converting means for converting music information of a format different from the first format into music information of the first format. The music information service system and the base station can convert music information for other models or general-purpose music information incompatible with the first format into music information of the first format for its own model.

In carrying out the invention and according to another aspect of format conversion, there is provided a music tone information service system, composed of a potable terminal apparatus that performs a tone process using music information of predetermined format and a base station having a music tone information source, wherein the base station comprises a means for receiving identification information associated with the terminal apparatus from the potable terminal apparatus, and a means for creating, on the basis of the identification information received, the predetermined format of music information from the music tone information source, and a base station, capable of distributing music information from a music tone information source to a potable terminal apparatus that performs the tone process using music information of a predetermined format, which comprises a means for receiving identification information associated with the terminal apparatus from the potable terminal apparatus, and a means for creating music information of the predetermined format from the music tone information source on the basis of the received identification information. Upon transmission of the information associated with the terminal (identification information) from the terminal to the base station (server), the music tone information service system and the base station can perform format conversion at the base station on the basis of the information concerned.

In carrying out the invention and according to still another aspect of format conversion, there is provided a potable terminal apparatus that performs a tone process using music information of a predetermined format, the potable terminal apparatus comprising a format converting means for converting music information of a format into music information of a first format different from that before conversion. The portable terminal apparatus can perform format conversion in its own terminal apparatus from music information for other models or general-purpose music information incompatible with the first format into music information of the first format for its own model.

In carrying out the invention and according to an aspect of trial listening, there are provided a music tone information service system, composed of a potable terminal apparatus capable of sounding a tone and a base station having a music tone information source, wherein the base station comprises a means for transmitting information from the music tone information source as streaming data, and the potable terminal apparatus comprises a means for performing real-time reproduction of the music information on the basis of the streaming data from the base station, and a base station, capable of distributing music tone information from a music tone information source to a potable terminal apparatus capable of sounding a tone, which comprises a means for transmitting information from the music tone information source to the potable terminal apparatus as streaming data. The music tone information service system and the base station can perform streaming transmission of information from the base station (server) to realize real-time trial listening on the portable terminal apparatus side.

In carrying out the invention and according to an aspect thereof related to a detachable recording medium, there are provided a potable terminal apparatus, capable of mounting a detachable small-size or compact recording medium, which comprises a means for retrieving music information stored in the detachable small-size recording medium, and a means for processing the retrieved music information, and another potable terminal apparatus, capable of mounting a detachable small-size recording medium, which comprises a means for processing music information, and a means for writing the processed music information into the detachable small-size recording medium. Of these portable terminal apparatuses capable of mounting a detachable small-size recording medium, the former terminal apparatus can retrieve or load music information from the recording medium into the terminal system, while the latter terminal apparatus can write music information from various information sources into the recording medium.

The portable terminal apparatuses according to the invention may have sound sources of an FM type, a waveform memory type, or a physical model type. The sound source circuit may be composed by DPS including a microprogram or composed by a CPU including software. It should be noted that "music tone information" and "performance information" may be interchangeably used in the specification if there is no need to discriminate therebetween. Further, "music information" may be used to cover both of "music tone information" and "performance information" as in the specification and the pending claims.

DETAILED DESCRIPTION OF THE INVENTION

This invention will be described in further detail by way of example with reference to the accompanying drawings. It should be noted that the following embodiments are for illustrative purpose only and therefore variations and modifications may be made within the scope of the invention.

Figure 1:
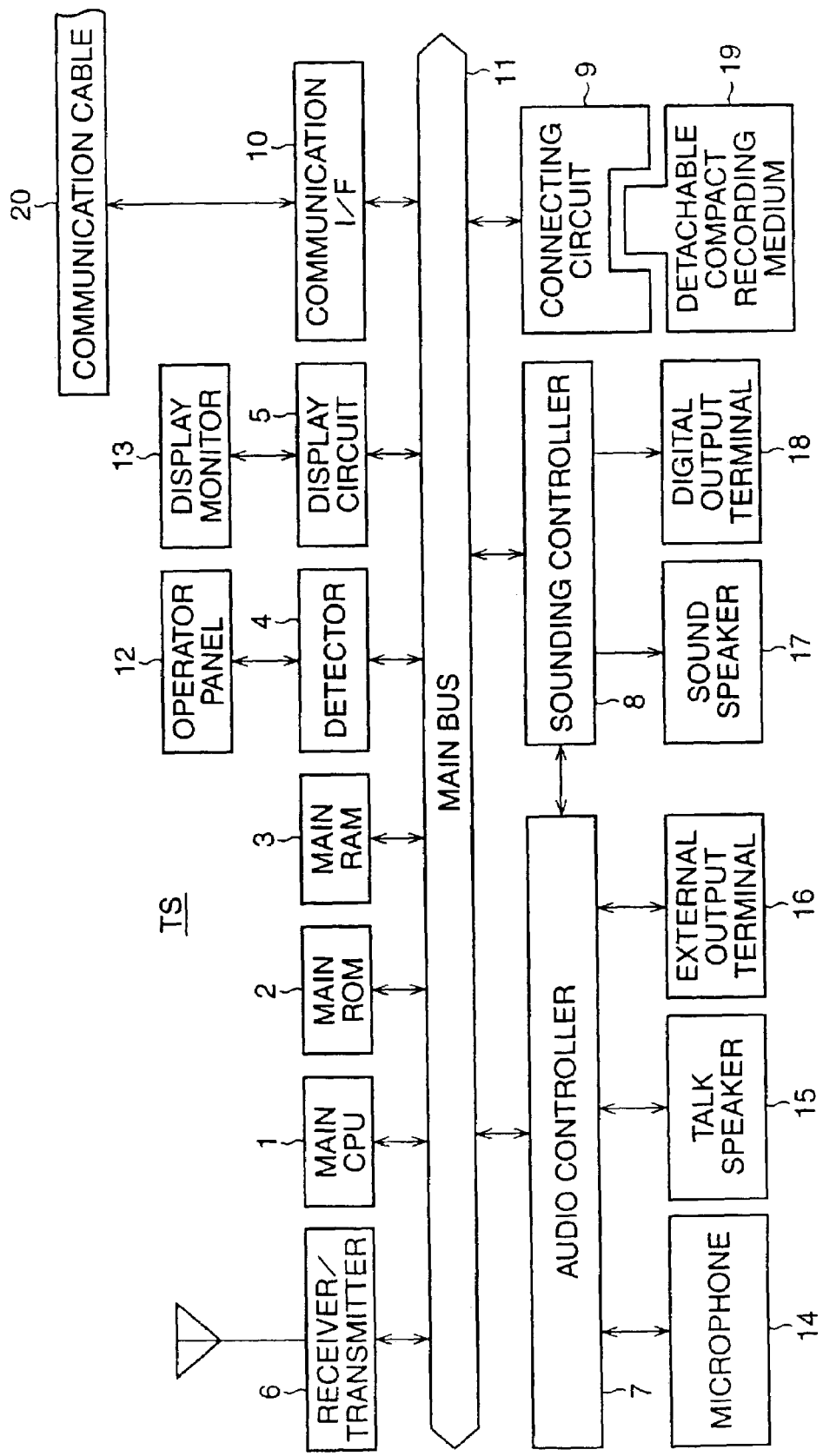
FIG. 1 is a schematic block diagram illustrating a basic configuration of a portable telephone terminal to which a sounding control apparatus practiced as one embodiment of the invention is applied.

Terminal System Overview:

Referring to FIG. 1, there is shown a block diagram illustrating a basic configuration of a portable telephone terminal to which a sounding control apparatus according to one embodiment of the invention is applied. A terminal system TS comprises a terminal system central processing unit (main CPU) 1, a terminal system read-only memory (main ROM) 2, a terminal system random access memory (main RAM ) 3, a detector 4, a display circuit 5, a receiver/transmitter 6, an audio controller 7, a sounding controller 8, a connecting circuit 9, and a communication interface (I/F) 10. These components 1 through 1 are interconnected by a terminal system bus (main body bus) 11.

In the above-mentioned mentioned terminal system TS, the main CPU 1 for controlling the terminal system in its entirety executes various control operations such as talk control, screen control, and sounding control according to predetermined computer programs. The main ROM 2 holds predetermined control programs and control data necessary for executing these control operations. For example, as for music, the main ROM 2 holds music information, performance information, configuration information, tables for information format conversion, and tables for information compression, each in plurality, for sounding call termination notice melodies and background music (BGM) to be played during talking. As for non-music information, the main body ROM 2 holds predetermined audio and video information as configuration information. The configuration information herein denotes information which is set as conditions for executing the processing associated with acoustic sounding or image display during talking or at other times. This configuration information includes audio information, video information, and audio and video control information in addition to the music-associated configuration information such as tone timbre and effect (including DSP).

The main RAM 3 holds data and parameters necessary for executing the above-mentioned talk control, screen control, and sounding control. To be specific, this memory stores plural pieces of music information, performance information, and configuration information which are additionally installed or newly created in the terminal system TS.

The detector 4 has an operator section 12 composed of controls such as push-button switches arranged on the surface of the body of the portable telephone terminal and detects the operation performed by the user on these controls. These controls include a talk switch for talking, a request switch for requesting the downloading of call termination melodies, a setting switch for setting the sounding controller 8 (tone generator/effector), and switches for creating and editing various pieces of information. The display circuit 5 is connected to a display 13 on LED screen of which various pieces of talk information, various pieces of melody information associated with sounding control, and various pieces of visual check information are shown.

The receiver/transmitter 6 has a communication antenna and communicates with other telephone terminals via a base station (or a server station or a repeater station) for talking. This circuit is also used for requesting and receiving music information and configuration information. The audio controller 7 controls voice signals at talking and tone input/output signals. This controller has a voice transmitting capability for transmitting an input voice from a microphone (MIC) 17 to the receiver/transmitter 6, a voice reproducing capability for sending a talk voice signal received at the receiver/transmitter 6 to a talk speaker 15 and an external output terminal 16, and BGM reproducing capability for sending a tone signal received from the sounding controller 8 to the talk speaker 15 and the output terminal 16.

The sounding controller 8 uniquely executes a sequence of processing operations for controlling tone signals such as melodious ringing tone and BGM tone and can sound two or more tones at a time. Namely, the sounding controller 8 has a capability of synthesizing a tone signal and sending it to the sound speaker 17 or the audio controller 7, thereby sounding tones such as melodious ringing tone and BGM. In addition, the sounding controller 8 has a digital output terminal 18 for sending a digital tone signal to other devices that use digital tone signals. It should be noted that the sound speaker 17 may be configured to function as the talk speaker 15.

The connecting circuit 9 allows a portable detachable small-size recording medium 19 to be loaded on this terminal system TS. The connecting circuit 9 captures various pieces of information including music information from the loaded small-size recording medium 19 into the terminal system and writes these pieces of information to the loaded small-sized recording medium 19. The communication I/F 10 has a cable connection terminal for connection with external equipment and communicates with other telephone terminals and personal computer (PC) terminals through a communication cable 20 connected to this terminal, capturing various pieces of information including music information from these devices into the terminal system TS and providing these pieces of information from the terminal system TS to these devices.

The small-size recording medium 19 can store music information and configuration information received from another telephone terminal or personal computer terminal through the communication cable 20 and the communication I/F 10, or from a server (BS) through the receiver/transmitter 6. It can also store music information automatically composed or edited by use of its own potable terminal apparatus TS. The music information and configuration information stored are then read out and sounded as ringing melodies or BGM. The removable compact recording medium 19 may be used for storing program instructions executable by CPU to perform the inventive process.

Sounding Controller (1)

Figure 2:
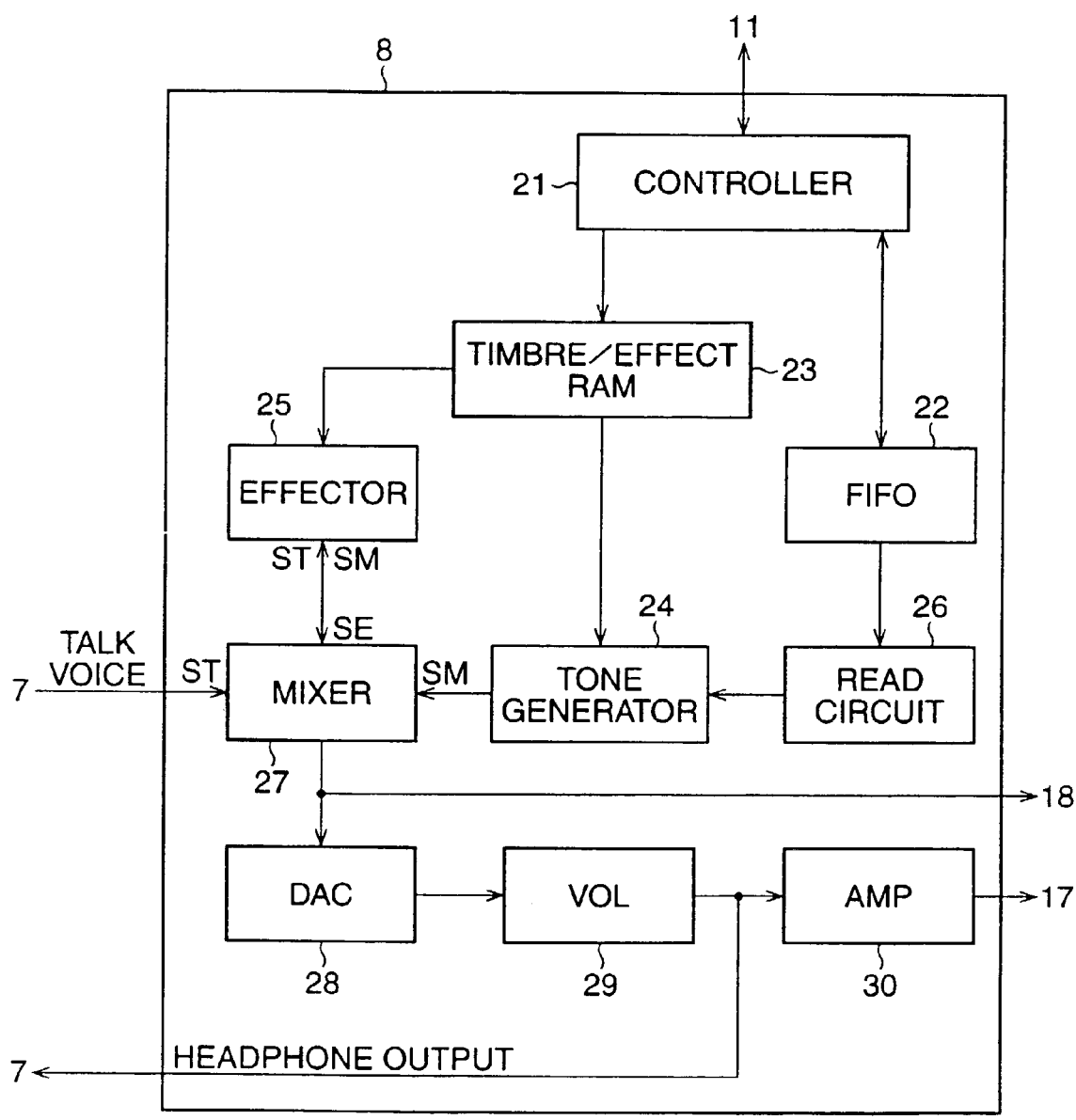
FIG. 2 is a block diagram illustrating a detail configuration of a sounding controller practiced as one embodiment of the invention.

Referring to FIG. 2, there is shown a block diagram illustrating a detail configuration of a sounding controller practiced as one embodiment of the invention. In this example, the sounding controller 8 contains no CPU; therefore, the sounding controller 8 is controlled by the main CPU 1 of the portable telephone terminal (the terminal system TS). The sounding controller 8 transfers music information, performance information, configuration information, and other information (such as about start/stop of reproduction) through a bus connection path connected to the system bus 11.

A controller 21 executes bi-directional communication with the terminal system TS main through the above-mentioned bus connection path. The performance information and configuration information prepared on the main side or supplied from the outside are stored in the main ROM 2 or the main RAM 3. The controller 21 stores the performance information in a first-in first-out (FIFO) memory 22 and the configuration information about timbre and effect in a timbre/effect RAM 23. In such a case, the performance information and the configuration information memorized in the FIFO 22 and RAM 23 covers a whole or part of one music song.

The controller 21 reads the timbre configuration information and effect configuration information (including DSP program) from the timbre/effect RAM 23 on the basis of the timbre and effect specified by the main side to set the timbre and the effect in a tone generator 24 and an effector 25 respectively. Further, the controller 21 sends information about the limits of storage capacities of the FIFO 22 and the timbre/effect RAM 23 to the main side, thereby requesting the main side to pause the information communication from the main side.

The FIFO 22 and a read circuit 26 function as performance information supply controller that sequentially sends the performance information received from the main ROM 2 or the main RAM 3 to a resource circuit. To be more specific, the FIFO 22 temporarily stores the received performance information in the order of reception. The read circuit 26 accesses the FIFO 22 at predetermined time intervals to sequentially read information if any and output it to the tone generator 24.

The tone generator 24 is an FM tone generator for example and can sound two or more tones at a time. The tone generator 24 sets a timbre to be sounded on the basis of timbre-associated configuration information received from the timbre/effect RAM 23 and, on the basis of the performance information received from the read circuit 26, sequentially synthesizes tone signals corresponding to the specified timbre to send them to a mixer (MIX) 27.

The effector 25 sets effects such as reverberation to be imparted on the basis of the effect-associated configuration information received from the timbre/effect RAM 23. The effector 25 imparts the specified effect to a signal inputted from the MIX 27 according to the DSP program and outputs the effected signal to the MIX 27.

A talk voice is inputted in the MIX 27 in the form of a digital signal through the connection path with the audio controller 7 of the terminal system TS main. The MIX 27 adds up the signals supplied from the tone generator 24, the effector 25, and the audio controller. To be more specific, the following signals are inputted in the MIX 27:
(1) a synthesized tone signal SM from the tone generator;
(2) a talk voice signal ST from the audio controller 7; and
(3) an effected signal SE from the effector 25.

The input signals SM and ST are selectively outputted from the MIX 7 to the effector 25 to be imparted with an effect. Which signal is to be effected may be selected by operating a predetermined switch on the operator section 12 of the terminal system TS. Then, the MIX 27 outputs all synthesized signals to a digital-to-analog converter (DAC) 28 and, at the same time, outputs these signals in the form of digital signals to the digital output terminal 18.

The DAC 28, an amplitude controller (VOL) 29, and an amplifier (AMP) 30 form an analog output unit. An analog music signal outputted from the DAC 28 is adjusted in volume by the VOL 29 to be outputted to the audio controller 7 of the terminal system TS main or sent to the sound speaker 17 through the AMP 30 for sounding as a tone. Namely, all the synthesized signals are outputted from the VOL 29 to the audio controller 7 in the form of analog signals and also from the AMP 30 to the speaker 17 in the form of analog signals for sounding.

Sounding Controller (2)

Figure 3:
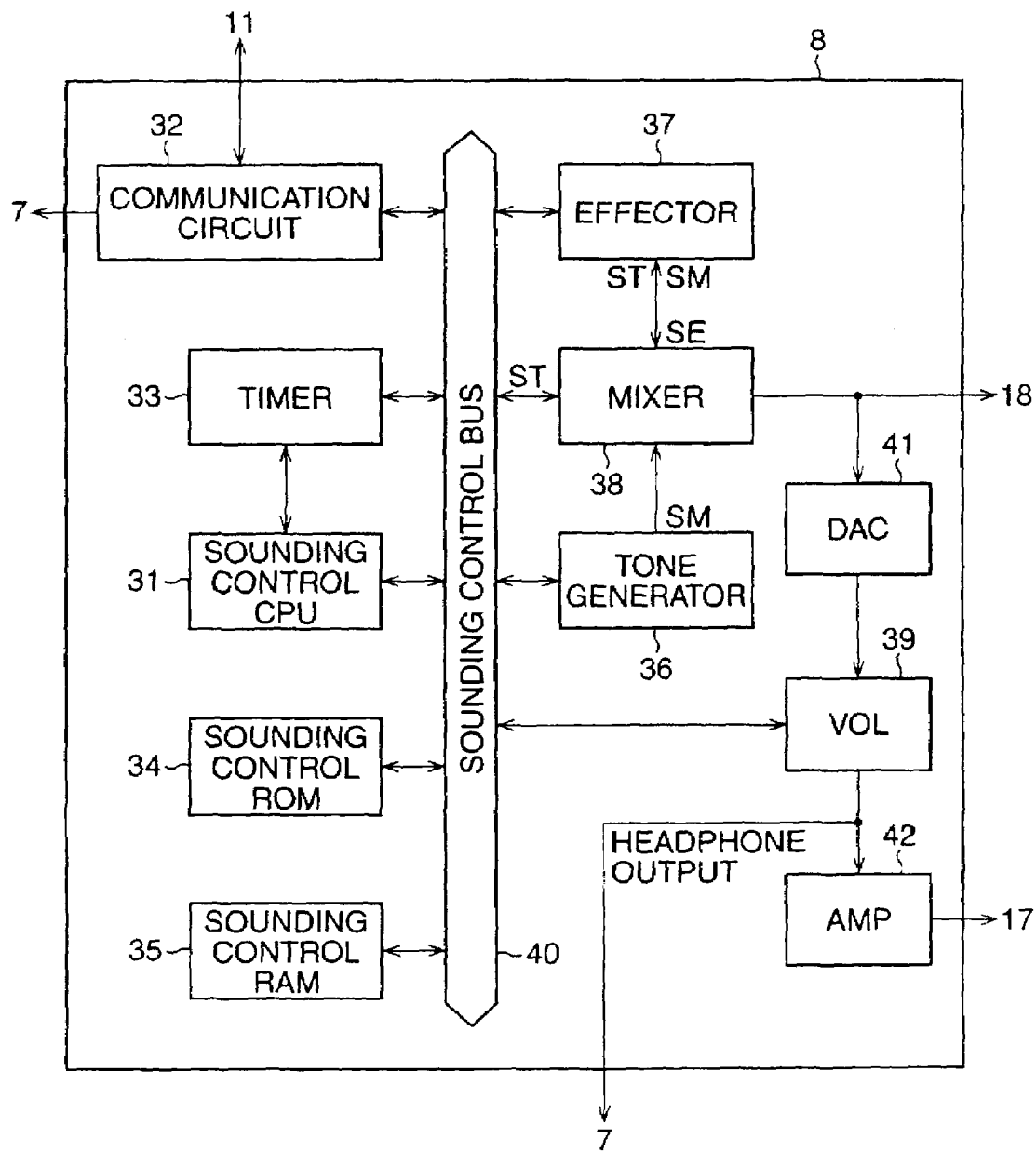
FIG. 3 is a block diagram illustrating a detail configuration of a sounding controller practiced as another embodiment of the invention.

Referring FIG. 3, there is shown a block diagram illustrating a detail configuration of a sounding controller practiced as another embodiment of the invention. In this example, the sounding controller 8 contains a sounding control CPU 31 which controls the operations of the sounding controller 8 independently of the main CPU 1. The sounding controller of this example has the sounding control CPU 31, a communication circuit 32, a timer 33, a sounding control ROM 34, a sounding control RAM 35, a tone generator 36, an effector 37, a mixer (MIX) 38, and an amplitude controller (VOL) 39. These circuits 31 through 39 are interconnected through a sounding controller bus (sounding control bus) 40.

The communication circuit 32 has the following two communication capabilities:
(1) Bi-directional communication with the main unit bus 11. The communication circuit 32 records the music information, performance information, and configuration information received from the outside of the terminal system TS through the main unit bus 11 into the sounding control RAM 35 (it should be noted that the sounding control ROM 34 holds various tables for sounding control). The communication circuit 32 also various pieces of information (about the operations done on the operator section of the TS main) associated with the selection of timbre and effect, parameter change, and selection of music information for reproduction. The received information is interpreted by the operation of the sounding control CPU 31. Processing according to the interpreted information, for example, the setting of a selected timbre, is executed on the tone generator 35. The configuration information corresponding to the selected timbre is read out from ROM 34 or RAM 35.

Further, when controls of the main body is operated to command editing of music information or configuration information stored in the tone generation control ROM 34 or tone generation control RAM 35 in the tone generation control circuit, selected information corresponding to the operation is read out from the ROM 34 or RAM 35, and is sent to the RAM 3 of the main unit. The edit process is executed by use of the main RAM 3. Upon completion of the edit process, the information is again overwritten into the RAM 35 of the tone generation control circuit.

(2) Bi-directional communication with the audio controller 7. The communication circuit 32 sends a tone signal for example synthesized inside the sounding controller 8 to the audio controller 7, manipulates, inside the sounding controller 8, a talk signal for example received from the audio controller 7, and sends the manipulated signal to the audio controller 7. The manipulation includes effect imparting to a talk voice and pitch/timbre conversion of talking voice for example.

The sounding control CPU 31 controls the operations inside the sounding controller 8 independently of the terminal system TS main and, on the basis of a signal generated by the timer 33, sequentially reads the performance information stored in the sounding control ROM 34 and the sounding control RAM 35, thereby reproducing melodious ringing tone and BGM. In addition, the sounding control CPU 31 sends the configuration information from the sounding control ROM 34 and the sounding control RAM 35 to the tone generator 36 and the effector 37 through the sounding control bus 40 for reproduction and controls tone timbre settings and effect impartment settings. It should be noted that such a start and stop process of the music performance is commenced in response to command operations utilizing controls 12 of the main unit.

The timer 33 generates a signal at predetermined time intervals. On the basis of the signal generated by the timer 33, the timing of sounding of melodious ringing tone and BGM is controlled to determine the performance tempo of each generated tone. This tempo may be controlled by the user.

Control of the tempo may be carried out by any technique. The following techniques are considered effective:
(1) a technique for changing the cycle during which the timer 33 generates a signal according to the set tempo (that is, for changing the music information processing cycle);
(2) a technique for changing the timing data value in the music information according to the set tempo with keeping the processing cycle (signaling cycle from the timer 33) constant; and
(3) a technique for changing how to count the timing data in the music information to be processed at one time with keeping the processing cycle (signaling cycle from the timer 33) constant.

When specifying a tempo, the user may specify an absolute value of the tempo ("120", "150" or the like), a word indicative of the tempo (such as "allegro" and "moderato"), a rate of change from a reference tempo (percent (%) or increases/decreases (±)), or an intuitive word ("quick", "slow" or "moderate"). These specifications are made via the operator section 12 of the main unit.

The sounding control ROM 34 stores predetermined information about melodious ringing tone and BGM, performance information, configuration information, conversion tables for information format conversion, and compression tables for information compression, each of these pieces of information being stored in plurality. The sounding control RAM 35 stores plural pieces of added or newly created music information, performance information, and configuration information.

The tone generator 36, in this example, is an FM tone generator and capable of sounding plural tones at a time. The tone generator 36 sets a sounding timbre on the basis of the timbre-associated configuration information supplied from the sounding control ROM 34 and the sounding control RAM 35. In addition, the tone generator 36, under the control of the sounding control CPU 31 and the timer 33, sequentially synthesizes tone signals corresponding to the set timbres on the basis of the performance information supplied from the sounding control ROM 34 and the sounding control RAM 35, outputting the synthesized tone signals to the MIX 38.

The effector 37 sets an effect to be imparted to a tone on the basis of the effect-associated configuration information supplied from the sounding control ROM 34 and the sounding control RAM 35 through the sounding control bus 40. The effector 37 also imparts an effect to the signal inputted from the MIX 38 and the talk voice signal ST for example inputted from the communication circuit 32 and outputs the effected signals SE to the MIX 38.

The MIX 38 adds up the inputted signals and outputs the added signals to the digital-to-analog converter (DAC) 41 and the digital output terminal 18. The signals to be inputted in the MIX 38 include:
(1) a synthesized tone signal SM from the tone generator 36;
(2) a talk voice signal ST from the audio controller 7; and
(3) an effected signal SE from the effector 37.

For effect imparting, the MIX 38 selectively outputs the input signals SM and ST to the effector 37. These output signals are set by the operation of a predetermined switch on the operator section 12 of the terminal system TS main.

The amplitude controller (VOL) 39 and the amplifier (AMP) 42 form an analog output unit. The volume of an analog tone signal outputted from the DAC 41 is adjusted in volume by the VOL 39. The adjusted analog tone signal is outputted to the audio controller 7 through the headphone terminal and to the sound speaker 17 through the AMP 42.

Figure 4:
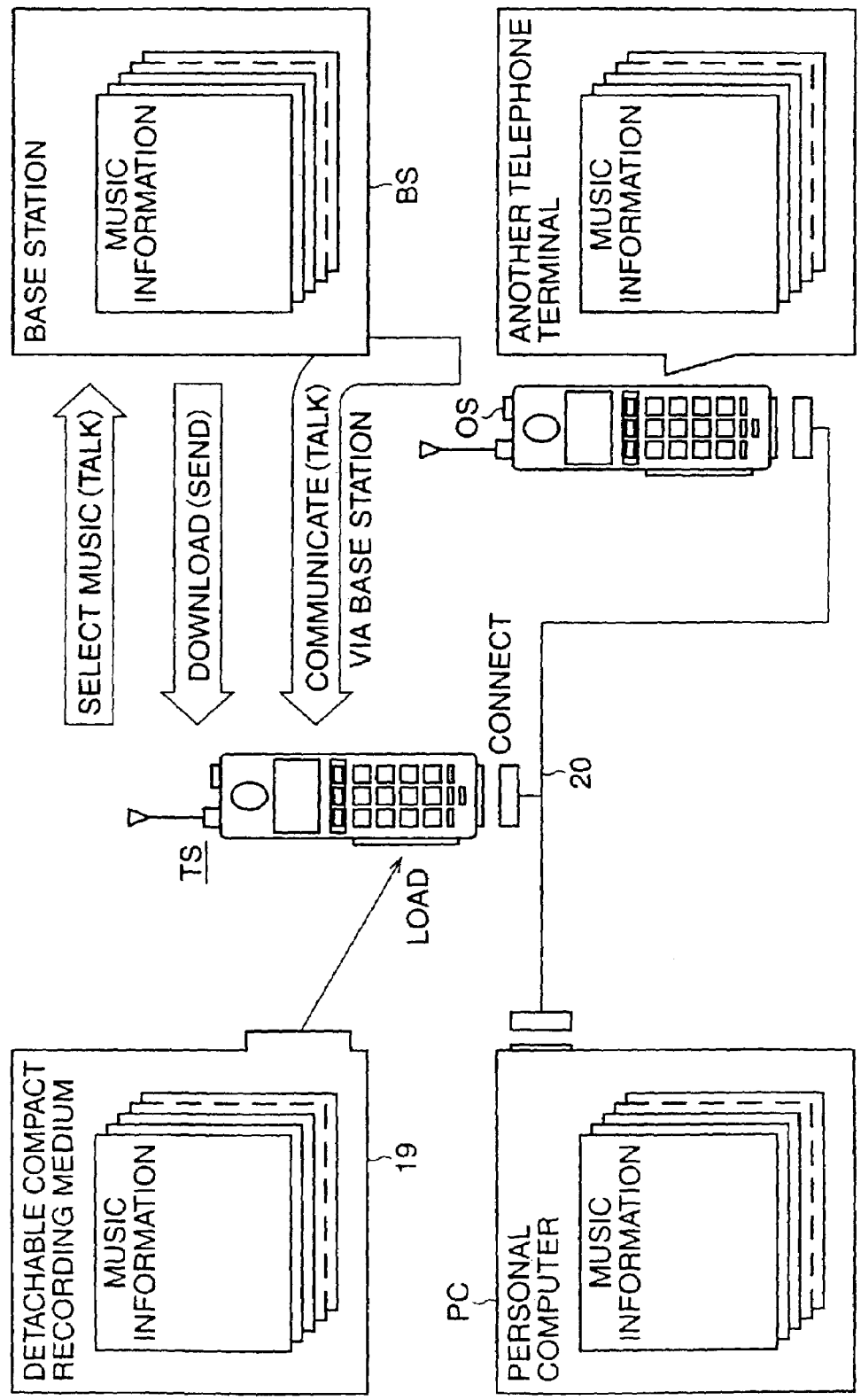
FIG. 4 is a schematic diagram illustrating one example of an environment in which the above-mentioned portable telephone terminal is used.

Usage Environment of the Terminal System:

Referring to FIG. 4, there is shown a schematic diagram illustrating one example of usage environment of the portable telephone terminal according to one embodiment of the invention. In a first environment, the user talks to the base station (server station) BS from the portable telephone terminal (the terminal system) TS through the receiver/transmitter 6, selects desired music information, and asks for the supply of the selected music information. The selected music information is sent from the base station BS to the terminal system TS. On the basis of the supplied music information, melodious ringing tone and BGM played during talking are sounded.

In a second environment, the terminal system TS receives the music information created in the personal computer terminal PC through the communication cable 20 connected to the communication I/F 10 and uses the received information as melodious ringing tone and BGM.

In a third environment, the terminal system TS captures music information from the small-size external recording medium 19 loaded in the connecting circuit 9. In a fourth environment, the terminal system TS receives music information from the OS of another telephone terminal through a telephone line and the receiver/transmitter 6 via the base station BS or via the communication cable 20 and the communication I/F and uses the received music information for music sounding.

The music information captured in the terminal system TS from such music information sources as the base station BS, the personal computer terminal PC, the external recording medium 19, and the OS of another telephone terminal is edited, compressed, and format-converted in the information source BS, PC, and TS to be downsized into a form usable in the terminal system TS.

For example, the music information (including performance information and configuration information) to be captured from the above-mentioned information sources into the terminal system TS may have a format suitable for the own model or have another format. In the case of the suitable format, the music information has been created in the suitable format from the beginning or converted from another format into the suitable format (this is referred to as format conversion). This format conversion is executed in the base station BS or the personal computer terminal PC. If the music information having another format is captured in the terminal system TS, that format is converted into the suitable format inside the terminal system TS.

Figure 5:
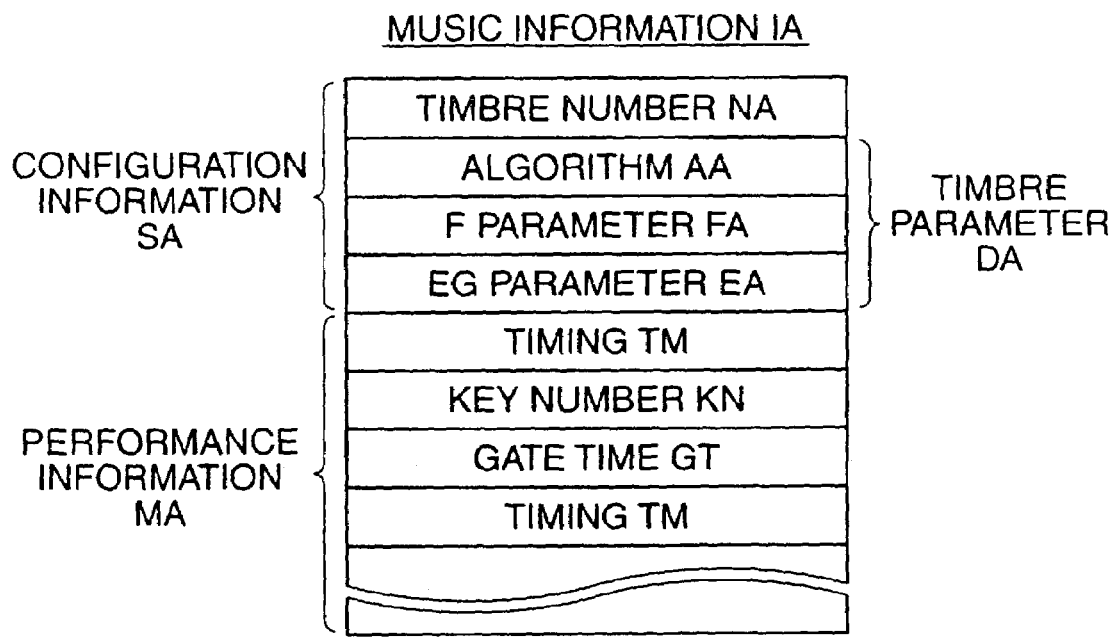
FIG. 5 is a diagram illustrating one example of an information format of own model in the above-mentioned portable telephone terminal.

Information Formats:

Referring to FIG. 5, there is shown an example of an information format of the own model of the above-mentioned portable telephone terminal. "Music information IA compatible with own model" that can be handled in this portable telephone terminal system TS and in other telephone terminals of the same model executing information processing in the same format as that this portable telephone terminal system TS is composed of configuration information SA for setting timbre/effect and performance information MA for tone performance as shown in FIG. 5. The configuration information SA and the performance information MA are stored in minimum necessary so that they do not much occupy the memory (the RAM 3) of the terminal system but realize good music sounding. In the terminal system TS, sounding is controlled according to these pieces of information. In the following, the information format of this type is referred to as "Own model format A."

As for timbre, the configuration information SA includes:
(1) timbre number NA for identifying timbre type; and
(2) detail information (timbre parameter) DA for timbre setting in the tone generator.

The timbre parameter DA of (2) above includes algorithm data AA, frequency parameter (F parameter) FA, and envelope parameter (EG parameter) EA.

Algorithm data AA determines a combination or an algorithm of plural operators in the FM tone generator (sine wave memory+output level computing unit+envelope (EG) waveform synthesizer). The F parameter FA determines the frequency of read sine wave for each operator. The EG parameter EA sets plural level values and rate values for synthesizing an envelope waveform (an EG waveform).

The configuration information SA includes information for effect parameter setting, an effect program (a DSP program) for determining the contents of the effector 25, audio information, and video information, in addition to the above-mentioned timbre-configuration information NA and DA.

The performance information MA includes performance information such as timing data TM, key number KN, and gate time GT in the order of performance that can sound two or more tones at a time.

Figure 6:
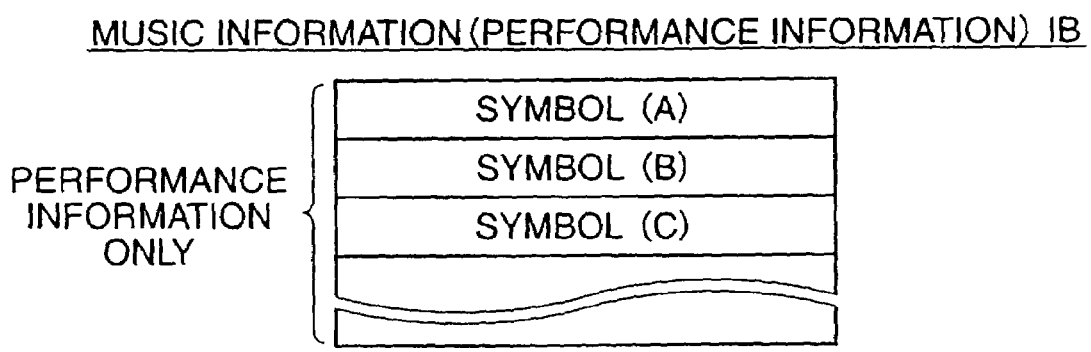
FIG. 6 is a diagram illustrating one example of a conventional information format of another model in a portable telephone terminal of another model.

Referring to FIG. 6, there is shown an example of a conventional information format in a portable telephone terminal of another model. The music information IB of conventional type used as melodious ringing tone in portable telephone terminals is only the performance information represented by a symbol sequence composed of symbols a, b, c, and so on as shown in FIG. 6 and therefore has no configuration information. In the following, the information format of this type is referred to as "Conventional-model format B."

To be more specific, the performance information IB of another model is a string of symbols (#, 1, 2, 3, and so on) inputted by a ten-key provided in the portable terminal apparatus, and is arranged in the order of performance according to a predetermined rule. For example, numeral "1" represents pitch "do", numeral "2" represents "re", and so on. According to the number of continuous numerals, the length of sounding is specified. Consequently, if symbol string a, b, c, and so on represents "1-1-2-1-1-...", then this symbol string represents a tone denoting that "do" is sounded for a quarter, "re" is sounded for an eighth, and then "do" is sounded for a quarter again.

Figure 7:
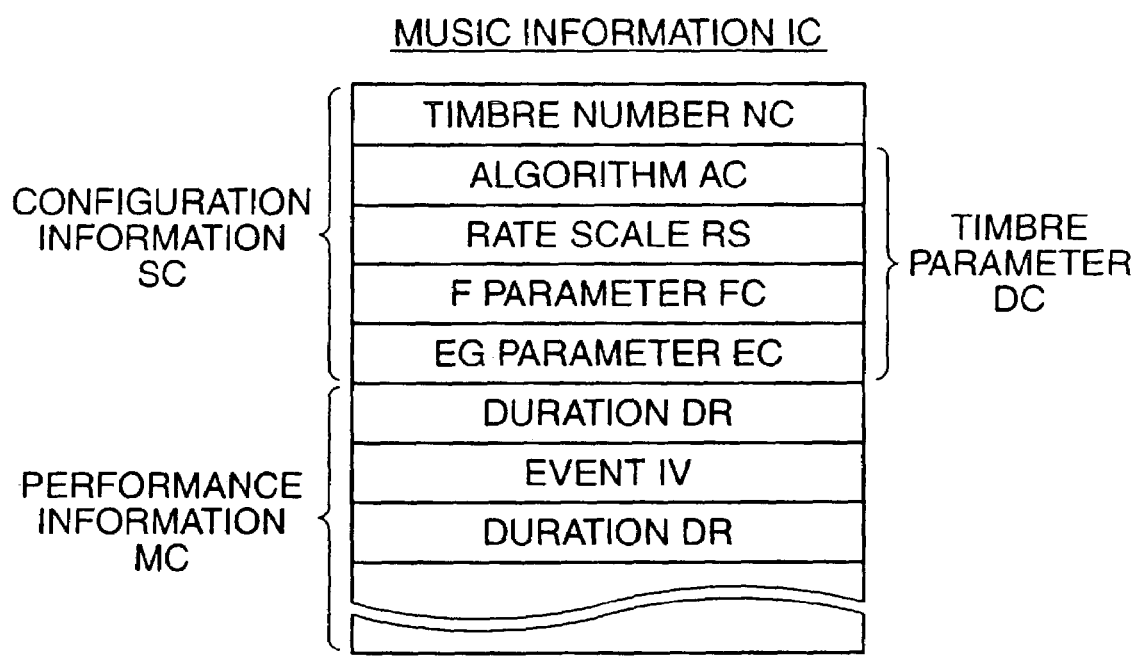
FIG. 7 is a diagram illustrating a general-purpose music tone information format conventionally used in electronic musical instruments for example.

Referring to FIG. 7, there is shown an example of a general-purpose music tone information format conventionally used in electronic musical instruments and so on. Conventional electronic musical instruments use a music tone information IC composed of configuration information SC for timbre/effect setting and performance information MC for tone performance along the general-purpose music tone information format (SMF (Standard MIDI File) format) as shown in FIG. 7. In the following, the information format of this type is referred to as "SMF format C."

Of the configuration information SC, the information for timbre setting includes:
(1) timbre number NC as timbre identification information; and
(2) timbre-setting detail information (timbre parameters) DC.

Unlike the timbre parameters DA for the terminal system TS, the timbre-setting detail information DC of (2) above has many pieces of information as shown in FIG. 7. For example, in addition to the algorithm data AC and the F parameter FC, the detail information DC includes rate scale data RS for controlling EG level by pitch to be sounded. The EG parameter EC also includes more detailed information and therefore has higher number of level values and rate values than the EG parameter EA in the configuration information SA in own model format A shown in FIG. 5. It should be noted that the excess information in the detail information DC is compressed (or deleted) as not indispensable in the terminal system TS when executing the format conversion from the SMF format into own model format A in the systems including the terminal system TS.

The performance information MC is of "duration DR+event IV" format. Key-on and key-off events are stored along with the duration data DR, so that the amount of the performance information MC is relatively large. In addition, velocity data are stored for each key-on event. The velocity data are also compressed (or deleted) in the format conversion into the own model format A.

In this embodiment, the music information IC of FIG. 7 and the music information IA of FIG. 5 have one part construction. Alternatively, the music information IC and IA may have multiple part construction. In such a case, a single of configuration information may be stored for all of the parts.

[Transfer of Information with Base Station]

Figure 8:
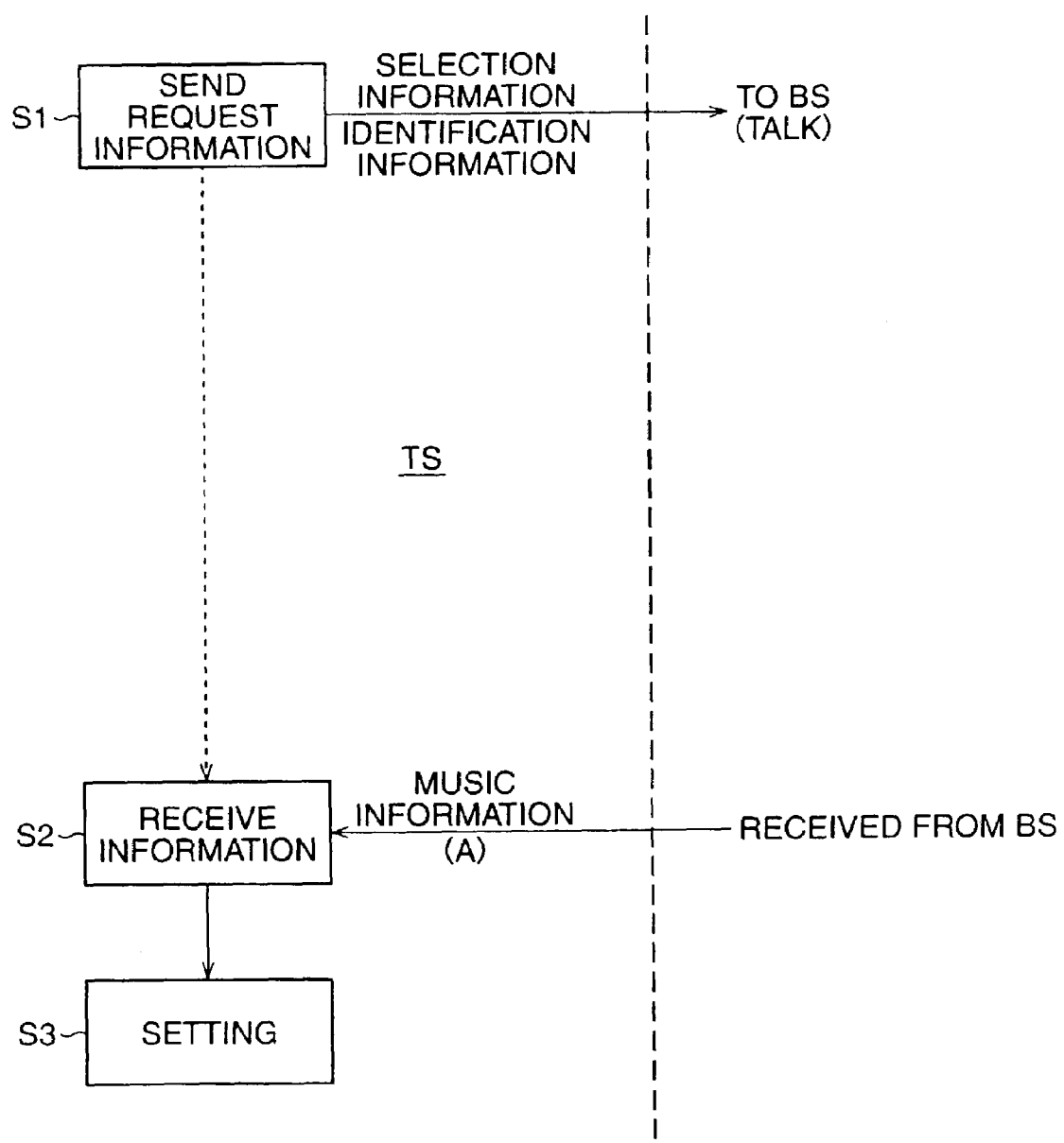
FIG. 8 is a part of a functional block diagram illustrating an information transfer relationship in a first system composed of the above-mentioned portable telephone terminal and a base station practiced as one embodiment of the invention.
Figure 9:
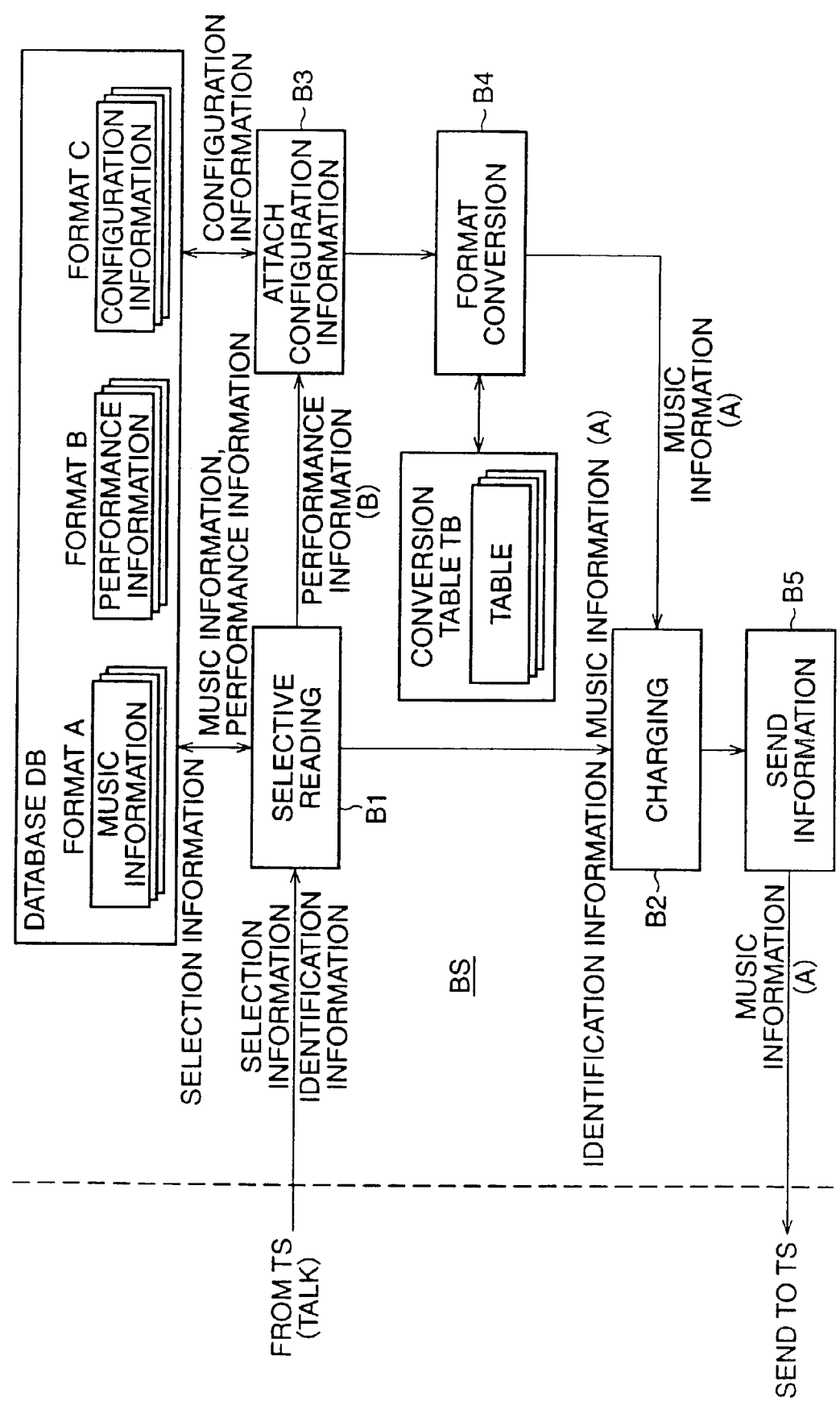
FIG. 9 is another part of the functional block diagram shown in FIG. 8.

Referring to FIGS. 8 and 9, there are shown functional block diagrams illustrating information transfer relationships between the above-mentioned terminal system and base station which constitute a first system. In the present invention, the own terminal namely the portable telephone terminal system TS receives music information and configuration information from the base station BS. These pieces of information are format-converted in the base station BS as required when they are requested from the terminal system TS. Therefore, when these pieces of information are received by the terminal system TS, they are in the format available for the terminal system TS.

First, the terminal system TS starts a request information send module (S1) and calls the base station (server station) BS through the receiver/transmitter 6, requesting the server station BS according to a predetermined instruction for downloading information from a database DB of the server station BS. To be more specific, during talking with the server station BS, the music information, performance information, and timbre information for example stored in the database DB are sequentially displayed on the display 13 of the own terminal system TS. The user operates corresponding keys on the operator section 12 to enter numbers indicative of these pieces of information and then executes a request decision operation. The selection information indicative of the information to be downloaded and the identification information indicative of the model and serial number of the own terminal system TS and the type of the tone generator installed in the tone generator 24 of the terminal system TS are sent to the server station BS.

In response to the request information received from the terminal system TS, the server station BS starts a selective reading module (B1) to selectively read the music information and so on corresponding to the request information from the database DB. A judgement module (not shown) determines a format type of the read performance information. In detail, the judgement module may check contents of format type information (indicative of format type of the information) attached the read information so as to recognize the format type. Otherwise, in case that the format type information is not attached, the judgement module may determine the format type from contents of the read information. As a consequence of the determination, in the case of own model format A, the read performance information and so on need not be format-converted, so that they are passed directly to a charging module (B2). If the format of the read performance information and so on differs from own model format as with the case of conventional-model format B, the read performance information and so on are passed to the charging module (B2) through a configuration information attaching module (B3) and a format converting module (B4).

If the performance information having a format other than the own model format has no configuration information as with conventional-model format B for example, the configuration information attaching module (B3) attaches configuration information to that performance information. This configuration information attachment allows the performance information for another model having no configuration information to be effectively reproduced with timbre/effect imparted by making the most of the tone generator capabilities in the terminal system TS. The configuration information is attached in one of the following manners:
(1) predetermined configuration information is attached;
(2) user-selected configuration information is attached; and
(3) configuration information fitting to performance information is automatically detected and attached.

The performance information attached with configuration information is passed to the format converting module (B4). The format conversion module converts the performance information to own model format A by use of a conversion table TB prepared before. This conversion table TB is prepared for each combination of formats before and after format conversion. For example, this table describes a conversion rule for conversion from conventional-model format B into own model format A, thereby converting the format of the performance information from the format of another model (B) into own model format A.

The format of another model includes SMF format C not shown in FIG. 9 in addition to conventional-model format B. For example, when information having SMF format C is read, it is format-converted by use of the conversion rule for conversion from SMF format C to own model format A stored in the conversion table TB. Therefore, if the requested information has a format of another model (B or C for example), such information is format-converted into the music information IA that can be sounded in the own terminal system TS, becoming available therein.

In case of a conversion from SMF format to the own format A, it is possible to carry out information compression in similar manner by an information compression module (P4) of FIG. 10 (as will be described later) prior to the format type conversion described here.

Then, the charging module (B2) executes a charging operation on the downloaded information. This charging operation may be adapted to discount billing amount when the terminal is recognized as a particular model or having a particular tone generator under a particular contract with the server station for example by referencing the identification information (including the model and serial number of the terminal and the type of tone generator) received from the terminal system TS.

When the charging operation has been completed, the server station BS starts an information transmission module (B5) to send the music information and configuration information having own model format A corresponding to the select information to the terminal system TS.

When these music information and configuration information have been supplied from the server station BS, the terminal system TS starts an information receive module (S2) to receive and download the music information and the configuration information through the receiver/transmitter 6. The downloaded information is stored in the main RAM 3. It should be noted that, during a period from requesting the information by the request information send module (S1) to the completion of supply of the requested information from the base station BS, the terminal system TS may be in a talking state. Alternatively, talking may be cleared once after sending of the request information and the requested information may be received by subsequent talk processing (by electronic mail or return talk from the base station BS).

Then, a setting module (S3) executes, as specified by the user, settings such that the melodious ringing tone can be sounded on the basis of the received music information. The setting module may also execute settings such that the received information is reproduced as BGM during talk or music to be played any time.

It may be expedient that the received music information or configuration information may be automatically set to the ringing melody or BGM sound immediately after the receipt of the information. Otherwise, at the time of the receipt, a music corresponding to the received information may be reproduced to confirm contents of the received information.

In the above-described system, the base station BS conducts attachment of configuration information, format conversion and information compression for the music information, performance information and configuration information. Alternatively, the terminal system TS may conduct these configuration information attachment, format type conversion and information compression as will be described later in conjunction with FIG. 11.

Figure 10:
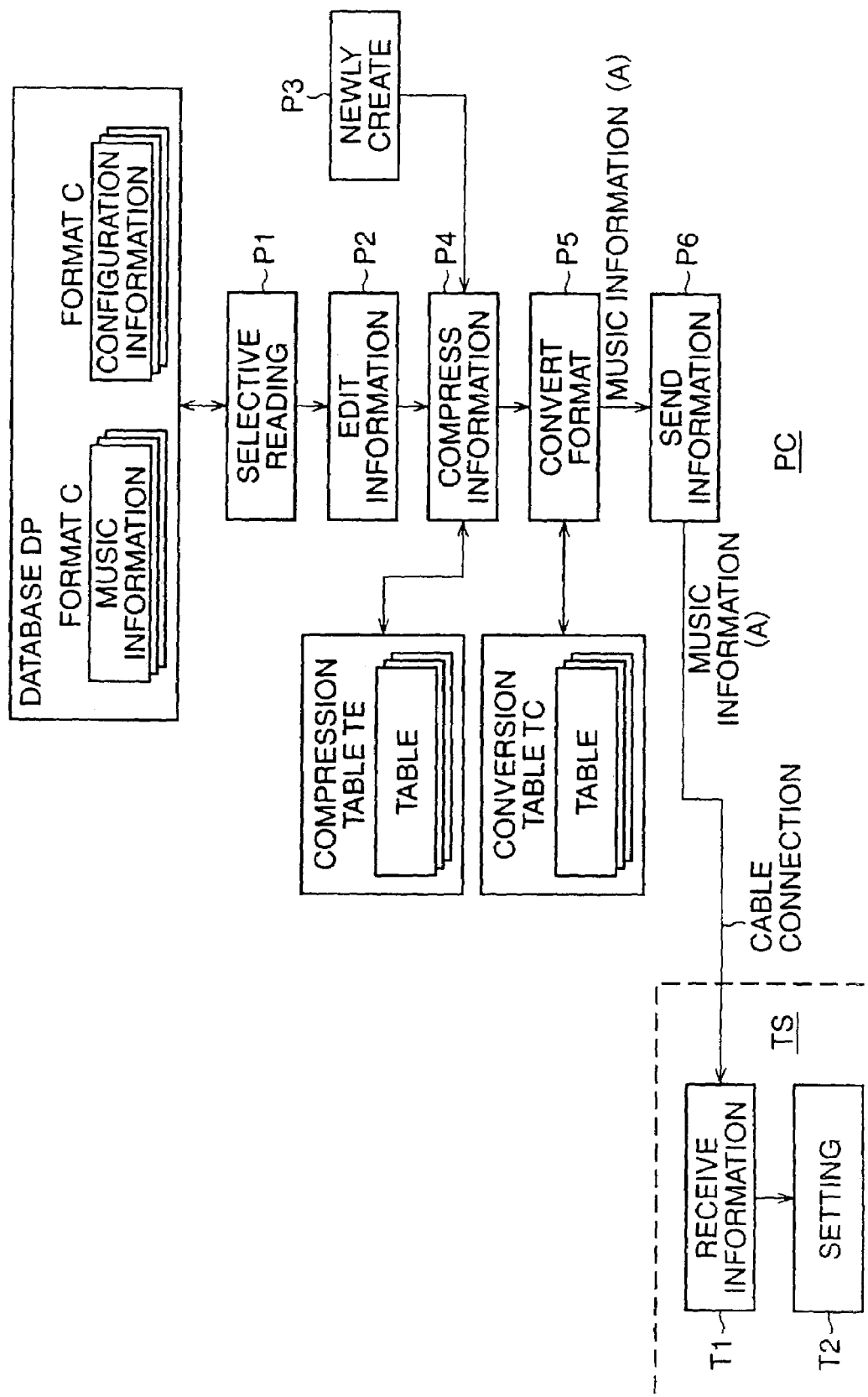
FIG. 10 is a functional block diagram illustrating an information transfer relationship in a second system composed of the above-mentioned portable telephone terminal and a personal computer practiced as one embodiment of the invention.

Information Transfer with Personal Computer:

Referring to FIG. 10, there is shown a functional block diagram illustrating a relationship of information transfer between the above-mentioned terminal system and a personal computer practiced as one embodiment of the invention, which constitute a second system. In this invention, the own terminal namely the portable telephone terminal system TS receives and uses the music information and configuration information created on the personal computer terminal PC. These music information and configuration information can be created in any format. For example, for ease of operation, these pieces of information may be created according to the conventional SMF format. If a format other than own model format A is used like this, format conversion into own model format A is executed by the personal computer PC at transmission.

In the personal computer terminal PC, a selective reading module (P1) selects, by use of installed predetermined software, the music information and configuration information to be used as melodious ringing tone or BGM from the database DB in the computer terminal PC in which the information is recorded in SMF format C or own model format A. An information edit module (P2) can edit the selected music information and configuration information. In editing, timbre and effect parameters in the configuration information are changed or added, portions for use as melodious ringing tone or BGM are selectively extracted from the performance information in the music information, and "trial sounding" is executed in a timbre and effect setting condition in which the selected music information is sounded in the same setting as the terminal system TS, namely on the basis of compressed configuration information.

Further, the database DP of the personal computer terminal PC may store the conventional format B of FIG. 6 other than the SMF format C and the own format A. In such a case, information associated to the conventional format may be also subjected to the similar editing as well as the attachment of the configuration information, the information compression and the format conversion as shown in FIG. 9.

As for newly creating music information on the personal computer terminal PC, new music information manually inputted by the user is created by a newly creating module (P3) by use of sequencer software (music information creating software) having conventional SMF format installed in the computer terminal PC for example. The new music information created here is music information compliant with SMF format C for example.

The newly creating module (P3) can also create new music information automatically by use of automatic composing software (or device). In this case, a conventional automatic composing program or device may be applied to execute jobs such as extracting only a part of music (a bridge for example) in a desired section from the music information for one piece of music created by conventional automatic composing software and/or automatic composing device, extracting only the information of minimum necessary tracks (melody track, harmony track, and so on) from the music information made up of plural tracks, and correcting joints (start and end positions of a section) so as to properly join the pieces of the extracted information when it is repeatedly reproduced. It should be noted that the newly creating module (P3) may also create the music information equivalent to melodious ringing tone and BGM in own model format A directly.

Of the information read and/or edited by the information edit module (P2) and the information newly created by the newly creating module (P3), the information having a format (for example SMF format C) other than own module format A is compressed by an information compressing module (P4) and format-converted by a format converting module (P5). On the other hand, the information having own model format A is directly passed to an information sending module (P6).

The information having a format other than own model format A is first compressed by the information compressing module (P4) by use of a predetermined compression table TE so as to be stored in the terminal system TS. This compression table TE is prepared for each combination of formats before and after compression and describes a predetermined compression rule. Specific processing based on this compression rule includes deletion of the above-mentioned unnecessary information such as the excess information in the rate scale RS and the EG parameter EC of SMF format C (refer to FIG. 7) at conversion into own model format A, extraction of the performance information of necessary tracks (melody track and harmony track only for example) from the performance information made up of plural tracks or parts, deletion of ornaments from the performance information, and changing of the pitch bend data in performance information in terms of pitch.

The compressed information is format-converted from SMF format C for example into own model format A by the format converting module (P5) by use of a conversion table TC as by the format converting module (B4) in the embodiment (the first system) shown in FIGS. 8 and 9.

The music information and/or configuration information supplied from the modules (P2 and P3) originally having own model format A and those supplied from the module (P5) compressed and converted into own model format A are sent to the terminal system TS through the information sending module (P6) to be captured in the terminal system TS through the communication cable 20 and the communication I/F 10.

In the terminal system TS, an information receiving module (T1) receives the music information and the configuration information supplied from the personal computer terminal PC and stores them into the main RAM 3. Then, a setting module (T2) makes a setting, as specified by a user operation, so as to sound melodious ringing tone and BGM on the basis of the received music information.

The processing by this information receiving module (T1) and the setting module (T2) may be similar to that executed by the information receiving module (S2) and the setting module (S3) of FIG. 8.

In the above-described construction, the personal computer terminal PC conducts editing of the music information, performance information and configuration information. Otherwise, the terminal system Ts may perform editing of information received from the personal computer terminal PS in similar manner by means of information record/edit module (U5) of FIG. 11 as will be described later.

Further, it will be expedient that the information stored in the terminal system TS is transmitted to the personal computer terminal through a communication cable 20, and the personal computer terminal may edit the transmitted information based on the above-described manner.

Figure 11:
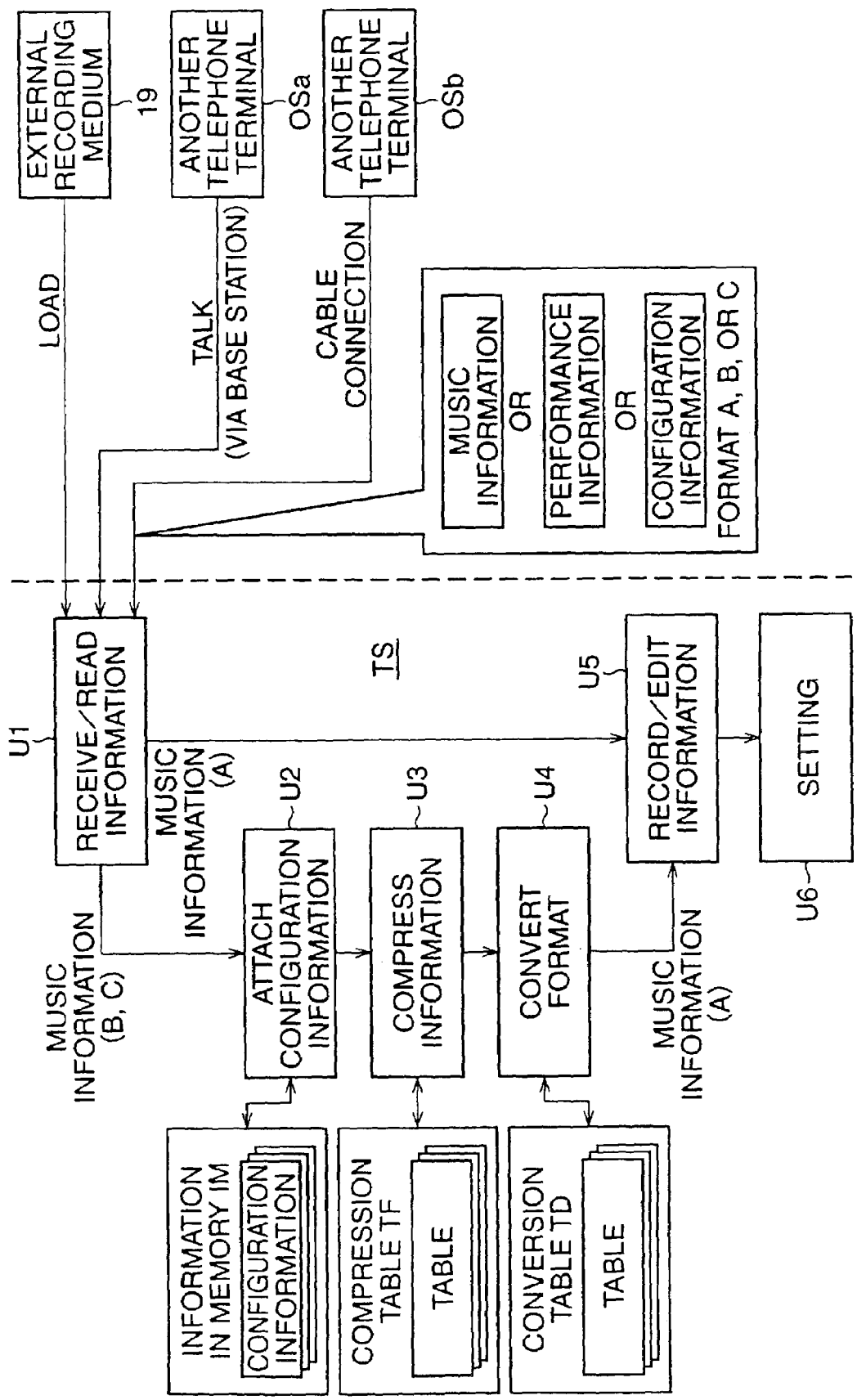
FIG. 11 is a functional block diagram illustrating an information transfer relationship in a third system composed of the above-mentioned portable telephone terminal and a recording medium and another telephone terminal.

Information Transfer between Recording Medium and another Terminal:

Referring to FIG. 11, there is shown a functional block diagram illustrating a relationship of information transfer between the above-mentioned terminal system and a recording medium and/or other terminals, which constitute a third system. In this invention, the own terminal namely the portable telephone terminal system TS can use, for creating melodious ringing tone or BGM, the information supplied from the external recording medium 19 or telephone terminal OSa or OSb of the same and/or different model as the own terminal. In this case, information compression, format conversion, and information editing can be executed in the own terminal system TS.

Processes such as information compression, format conversion and information edit may be carried out by other telephone terminals (Usa, Usb) to form information of the own format A instead of the terminal system as will be described net in detail. Thereafter, the formed information may be received by the terminal system TS.

Music information, performance information, and configuration information are recorded beforehand on the detachable small-size recording medium 19 in own model format A or another format (for example, format B or C). The recording medium 18 is then loaded on the own terminal system TS and desired information (attached with information indicative of a format of the information) is read through the connecting circuit 9. Each information is attached with formant type information indicating the format type of each information. The user can read desired information by operating a predetermined switch arranged on the operator section 12 of the own terminal system TS.

Information supplied from another telephone terminal OSa is captured in the own terminal system TS via the base station BS over the telephone line through the receiver/transmitter 6. Information supplied from still another telephone terminal OSb is captured in the own terminal system TS over the communication cable 20 through the communication I/F 10. These telephone terminals OSa and OSb may use the information of the same format, namely own model format A, or of a different format such as conventional-model format B or SMF format C.

With regard to the transmission from other telephone terminals (Osa, Osb), there are available two methods. In one method, command operation is carried out in the own terminal system TS to request transmission of desired information to other telephone terminals (Osa, Osb). In another method, command/operation is carried out in other telephone terminals (Osam Osb) to request receipt of desired information to the own terminal system TS.

When sending information from the telephone terminal OSa or OSb, information indicative of the format of the information to be sent (formant type information) is attached thereto. It should be noted that the telephone terminal OSa or OSb may be adapted to request the receiving terminal or the own terminal system TS to set and use the received information real-time (namely, the received information is immediately set and used in the own terminal system TS). When sending information through the base station BS, the base station may be adapted to compress and format-convert the information to be sent to the receiving terminal (the own terminal) in manner similar to the case of FIGS. 9 and 10.

An information receiving/reading module (U1) reads music information, performance information, and configuration information from the external recording medium 19 or captures these pieces of information from the telephone terminals OSa and OSb as described above. The judgement module (not shown in the figure) determines the format type of the read or taken information in manner similar to the process described in conjunction with select/read module (B1) of FIG. 9. Of the read or received pieces of information, the information having conventional-model format B or SMF format C is compressed and format-converted through a line of a configuration information attaching module (U2), an information compressing module (U3), and a format converting module (U4). The compressed and format-converted information is then passed to an information recording/editing module (U5). The information having own model format A is directly passed to the information recording/editing module (U5).

Basically, the configuration information attaching module (U2), the information compressing module (U3), and the format converting module (U4) execute the same processing as executed by the configuration information attaching module (B3), the information compressing module (P4), and the format converting modules (B4 and P5) in the embodiment (the first system) shown in FIGS. 8 and 9 and the embodiment (the second system) shown in FIG. 10. The configuration information attaching processing by the configuration information attaching module (U2) is executed only on the information having no configuration information as with the information of conventional-model format B. These information compressing and format-converting processing operations are executed either after the entire information is received and written to the memory (the main unit memory RAM 3) of the own terminal system TS or real-time while the information is being received, only the necessary information being stored in the memory (the main RAM 3). The latter method is effective for portable telephone terminals having a relatively small size of memory.

The information passed to the information record/edit module (U5) is stored in the main RAM 3 of the own terminal system. Thereafter, the information can be edited by means of various switches of the operation controls 12. The editing jobs include addition, deletion, and changing of various parameters contained in the configuration information SA. Further, this module (U5) allows to newly create music information. Then, the setting module (U6) makes a setting by a controller 12, as specified by a user operation, so as to sound melodious ringing tone and BGM on the basis of the received music information.

[Own Terminal Processing in the Own Terminal System]

Figure 12:
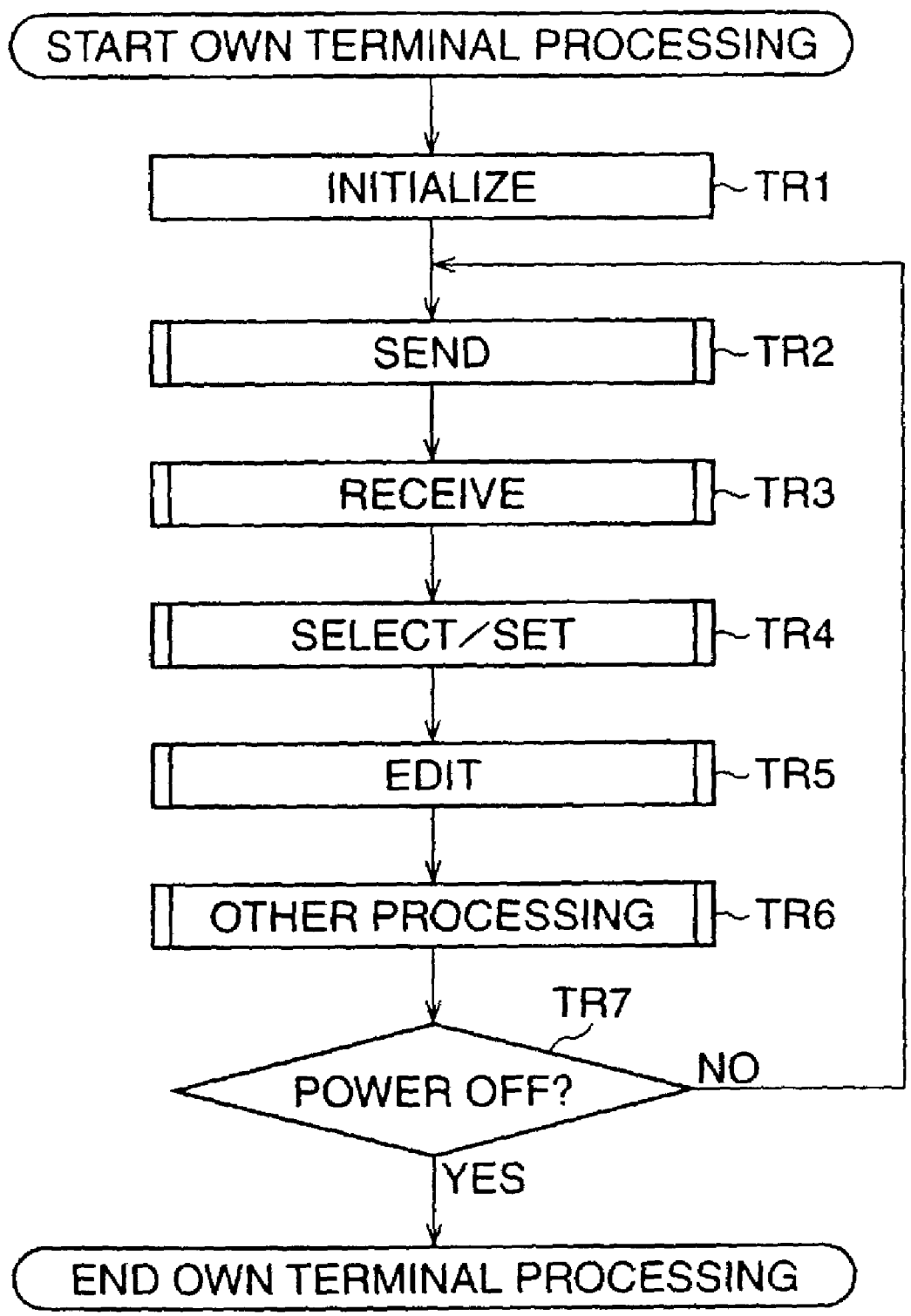
FIG. 12 is a flowchart indicative of one example of own terminal processing in the above-mentioned portable telephone terminal.

Referring to FIG. 12, there is shown one example of own terminal processing flow in the above-mentioned terminal system. This own terminal processing is executed in the own terminal system TS in the case of the embodiment (the first system) shown in FIGS. 8 and 9, the embodiment (the second system) shown in FIG. 10, and the embodiment (the third system) shown in FIG. 11. First, in step TR1, the own terminal system TS is initialized when its power is turned on. To be more specific, a predetermined melodious ringing tone is set, initial parameters are set to the tone generators 24 and 36 and the effectors 25 and 37, and other initialization processing operations associated with the portable telephone terminal are executed. After completion of the initialization, the processing routines of steps TR2 through TR6 are sequentially executed.

Step TR2 is a send processing routine in which various pieces of information involved in a normal talking operation are sent and, in the case of the embodiment (the first system) shown in FIGS. 8 and 9, selection information and identification information are sent as required. In the embodiments of FIGS. 10 and 11, (the first and second systems), processes are carried out such as transmission of request information requesting desired information. Step TR3 is a receive processing routine in which the received information is analyzed and various processing operations are executed accordingly, making the receiving information available as melodious ringing tone or BGM. Further, regular processes are carried out such as receipt confirmation for call request in the portable telephone terminal. In this step, in the case of the embodiment (the first system) shown in FIGS. 8 and 9 and the embodiment (the second system) shown in FIG. 10, the received information is written to the main RAM 3; in the case of the embodiment (the third system) shown in FIG. 11, the received information is attached with configuration information, compressed, and format-converted, the resultant information being stored in the main RAM 3.

Step TR4 is a select/set processing routine in which the user operates a predetermined switch in the operator section 12 to select the information for use as melodious ringing tone or BGM from the information stored beforehand in the main ROM 2 of the own terminal system TS or the received information stored in the main RAM 3. In this case, if the selected information includes performance information, it is read and set so that it becomes available as melodious ringing music tone information or BGM information. If the selected information includes configuration information, various settings are executed accordingly. For example, timbre parameter PT is set in the tone generators 24 and 36, effect parameter PE is set in the effectors 25 and 37, effector programs are changed by an effect program (DSP program) for determining the contents of the effectors 25 and 37, and settings associated with audio information and video information are made.

In the case of the embodiment (the first system) shown in FIGS. 8 and 9, the user operates a predetermined switch on the operator section 12 to select the information to be downloaded. In the case of the embodiment (the third system) shown in FIG. 11, in step TR4, the user operates a predetermined switch on the operator section 12 to read desired information from the external recording medium 19.

Step TR5 is an edit processing routine in which, in the case of the embodiment (the third system) shown in FIG. 11, information editing processing or information newly creating processing is executed according to the operation of a predetermined switch on the operator section 12.

This terminal system TS may be provided with an automatic composing capabilities. In this case, automatic composing operations are executed as another processing operation by another processing routine in step TR6. The automatic composing capabilities include:

(1) automatically converting a melody entered by the user through the microphone into performance (music) information;
(2) selecting an atmosphere for example of music by operating a predetermined switch on the operator section 12 to automatically create performance (music) information corresponding to the selecting operation; and
(3) automatically create the performance information associated with a chord fitting the performance information already created or stored.

This terminal system TS may also be provided with a style reproducing capability for recording plural pieces of style information and performance information beforehand and joining them to reproduce as a piece of music. In this case, the style reproducing operation is executed by another processing routine in step TR6. In addition, step TR6 may be provided with a music game capability for executing a music game to be played only on the own model or in communication with another model.

The processing routines of steps TR2 through TR6 are repeated unless a power-off sequence is detected in step TR7 (namely, unless the terminal system TS is powered off). Upon detection of the power-off sequence, this own terminal processing is ended.

Figure 13:
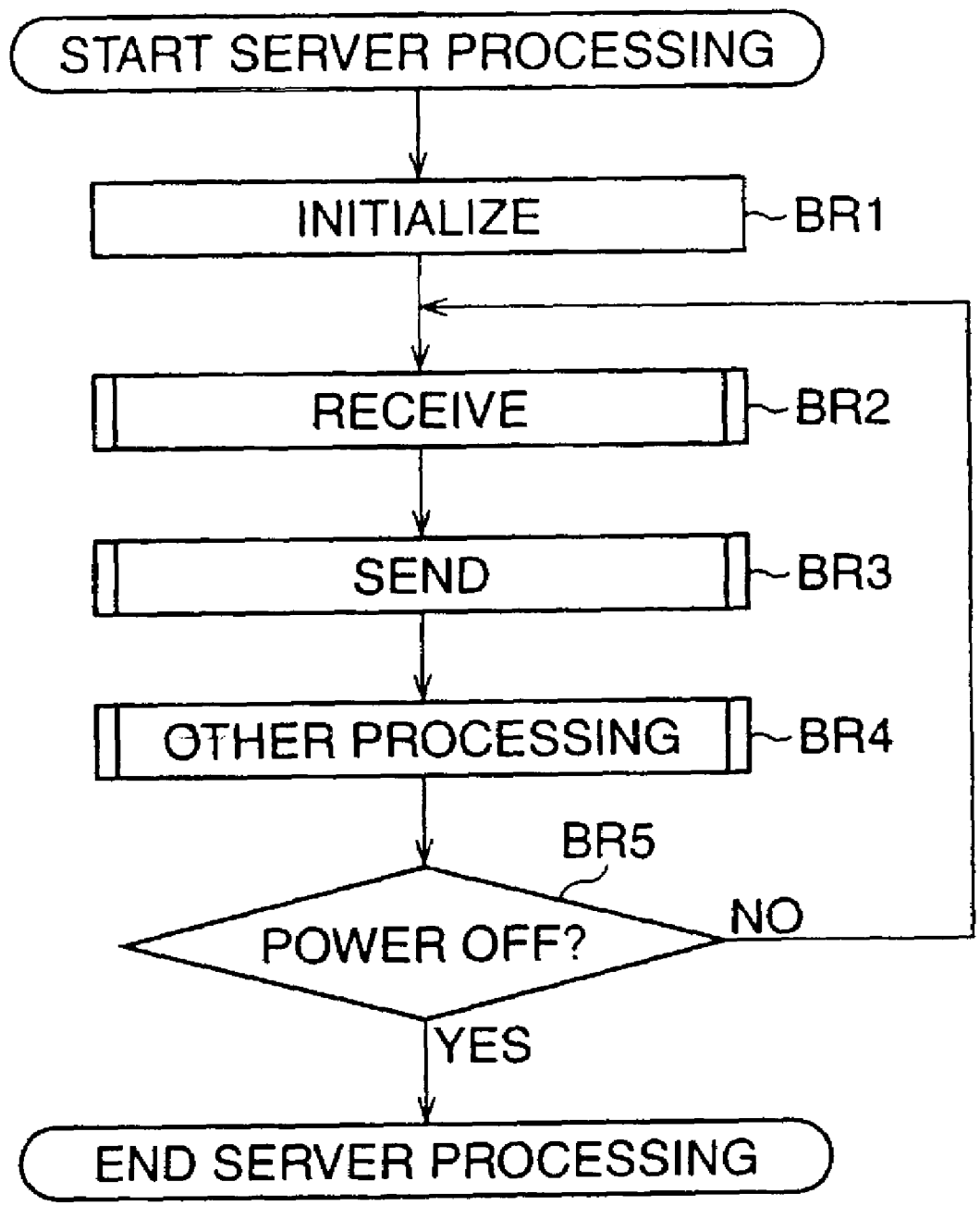
FIG. 13 is a flowchart indicative of one example of server processing in the above-mentioned base station.

Server Processing in the Base Station:

Referring to FIG. 13, there is shown one example of a server processing flow in the above-mentioned base station. This server processing is executed in the base station (server station) BS in the case of the embodiment (the first system) shown in FIGS. 8 and 9 and the embodiment (the third system) shown in FIG. 11. First, in step BR1, predetermined initialization processing is executed. Then, in steps BR2 through BR4, processing routines are sequentially executed.

In a receive processing routine of step BR2, the following processing operations (1) through (4) are executed in the case of the embodiment (the first system) shown in FIGS. 8 and 9:

(1) talk processing for responding a talk from the terminal system TS for requesting downloading;
(2) receive processing for receiving selection information and identification information from the terminal system TS at responding the talk;
(3) selectively reading processing (the selectively reading module B1) for selectively reading the information to be sent to the terminal system TS according to the received selection information and configuration information attaching processing (the configuration information attaching module B3) and format converting processing (the format converting module B4), the latter two being executed as required; and
(4) charging processing (the charging module B2) to be executed according to the received identification information.

In the case of the embodiment (the third system) shown in FIG. 11, the receive processing routine of step BR2 executes via processing associated with the information transfer between the terminals OSa and TS as a via means for use in sending information from the telephone terminal OSa to the receiver/transmitter 6 of the terminal system TS via telephone line. In this via processing, the format conversion processing is executed as required.

In the case of the embodiment (the first system) shown in FIGS. 8 and 9, the send processing routine of step BR3 sends the information read from the database DB in the server station BS and format-converted into own model format A as required to the terminal system TS. At sending, other pieces of information such as charging information may be attached to this information. In the case of the embodiment (the third system) shown in FIG. 11, the send processing routine sends the information received from the terminal system TS to another telephone terminal OSa and the information selected by the terminal system TS contained in the database DB in the server station BS to the telephone terminal OSa.

The processing routine of step BR4 can also send only part of music information, performance information, and configuration information to answer a request from the terminal system TS. For example, this routine can send only the information associated with timbre in the configuration information without sending the effect-associated information. This routine also allows trial listening of music information for example by streaming transmission (real-time reproduction) of information.

In streaming transmission, music information is so reproduced that each reproduced event is packeted in real time, or that plural events close in time to one another are packeted in a batch together with time difference information among the events. These packets are then sent from the server BS to the terminal system TS by streaming transmission. The terminal system TS receives the transmitted packets, temporarily stores them in the main RAM 3 or FIFO 22, and reproduces music based on the music information stored.

The processing routines of steps BR2 through BR4 are repeated unless a power-off sequence of the server station BS is detected in step BR5. Upon detection of the power-off sequence, this server processing is ended.

Figure 14:
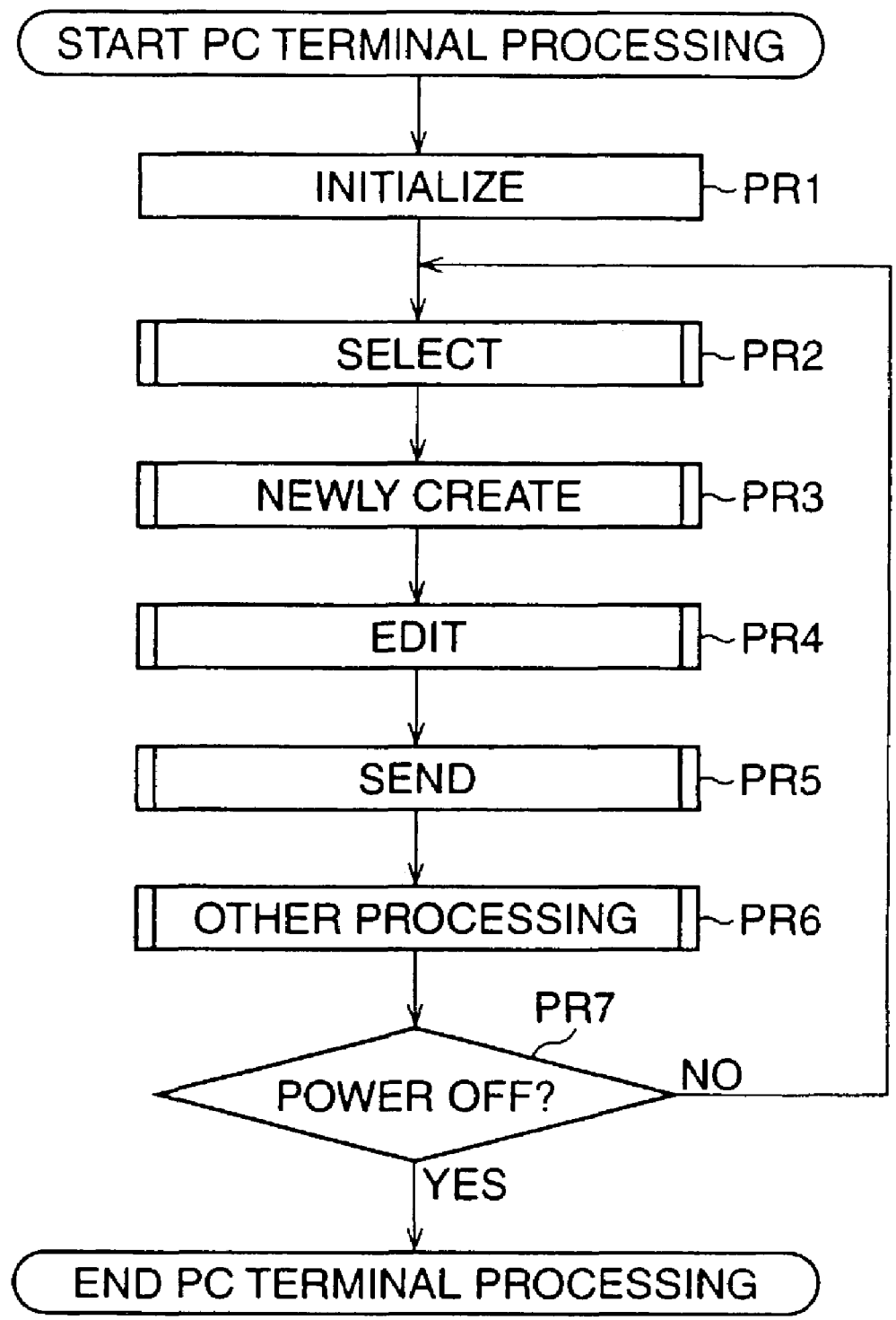
FIG. 14 is a flowchart indicative of one example of PC terminal processing in the above-mentioned personal computer terminal.

PC Terminal Processing in Personal Computer:

Referring to FIG. 14, there is shown one example of PC terminal processing flow in the above-mentioned personal computer. This PC terminal processing is executed in the personal computer terminal PC in the case of the embodiment (the second system) shown in FIG. 10. First, a predetermined initialization processing is executed in step PR1. Then, the processing routines of steps PR2 through PR6 are sequentially executed.

The select processing routine of step PR2 selects music information and configuration information to be used for melodious ringing tone or BGM from a database PD in the personal computer terminal PC in which the information is recorded in SMF format C or own model format A (the selective reading module P1).

The new creation processing routine of step PR3 newly creates music information compliant with SMF format C or own model format A by use of conventional sequencer software, music information creating software, and automatic composing software (device) for example (the newly creating module P3).

The edit processing routine of step PR4 edits the selected music information and configuration information (the editing module P2). The send processing routine of step PR 5 executes information compression, format conversion, and information sending (the information compressing module, the format converting module, and the information sending module P4 through P6).

Further, the other processing routine of step PR6 attaches other information to the configuration information SA. The information to be attached here includes an effect program (DSP program) for determining the contents of the effector, audio information, and video information.

The processing routines of steps PR2 through PR6 are repeated unless a power-off sequence of the personal computer terminal PC is detected in step PR7. Upon detection of the power-off sequence, this PC terminal processing is ended.

[Exemplary Uses of Audio Information and Video Information]

As described, the present invention uses audio information and video information as the configuration information other than music-associated information. For example, audio information is of WAVE, AIFF, SOUND VQ, or MP3 for example depending on how the audio information is compressed. The present invention allows common formatting to capture the audio information having these formats and, along with the creation of tone signals based on music information, create audio signals for guidance.

Video information may be used to display an icon representative of the other party at call termination therefrom and synchronize the icon with the reproduction of the melodious ringing tone or sequentially display musical notes corresponding to tone signals, for example.

[Karaoke Capabilities]

In the portable terminal apparatus practiced as one embodiment of the invention, the system may be put in a so-called "karaoke" mode to realize a karaoke capability by which words of a song are sequentially displayed in synchronization with the performance of that song, the user signing to the reproduced music by following the words running on the display. To make the portable telephone terminal (the terminal system) TS execute the karaoke capability, the controls of the operator section 12 (refer to FIG. 1) are used as a karaoke mode select switch and a karaoke song select switch for example. In this case, the switches dedicated to karaoke may be provided or any of the existing switches may be diverted to control the karaoke capability. For example, every time the karaoke mode select switch is operated, the karaoke mode and the non-karaoke mode may be switched between. When the karaoke mode is set, the numeric keys for inputting telephone numbers may be used to select karaoke songs.

In the karaoke mode, the music information for karaoke is preferably used. The karaoke music information has performance data and words data in performance information, which are recorded in the main ROM (the internal memory) along with other music information beforehand. Alternatively, the karaoke music information may be received from the detachable small-size recording medium 19, the personal computer terminal PC, other telephone terminals, the base station BS, or other external devices to be stored in the main RAM (the internal memory). In the karaoke mode, the music information thus recorded is processed by the karaoke processing capability of the main CPU 1, the configuration information and the performance data included in the processed music information being supplied to the sounding controller 8. The resultant music performance output is sounded from the speaker 17 or a headphone while the karaoke words are displayed on the display 13 of the terminal system TS on the basis of the words information included in the music information.

Figure 15:
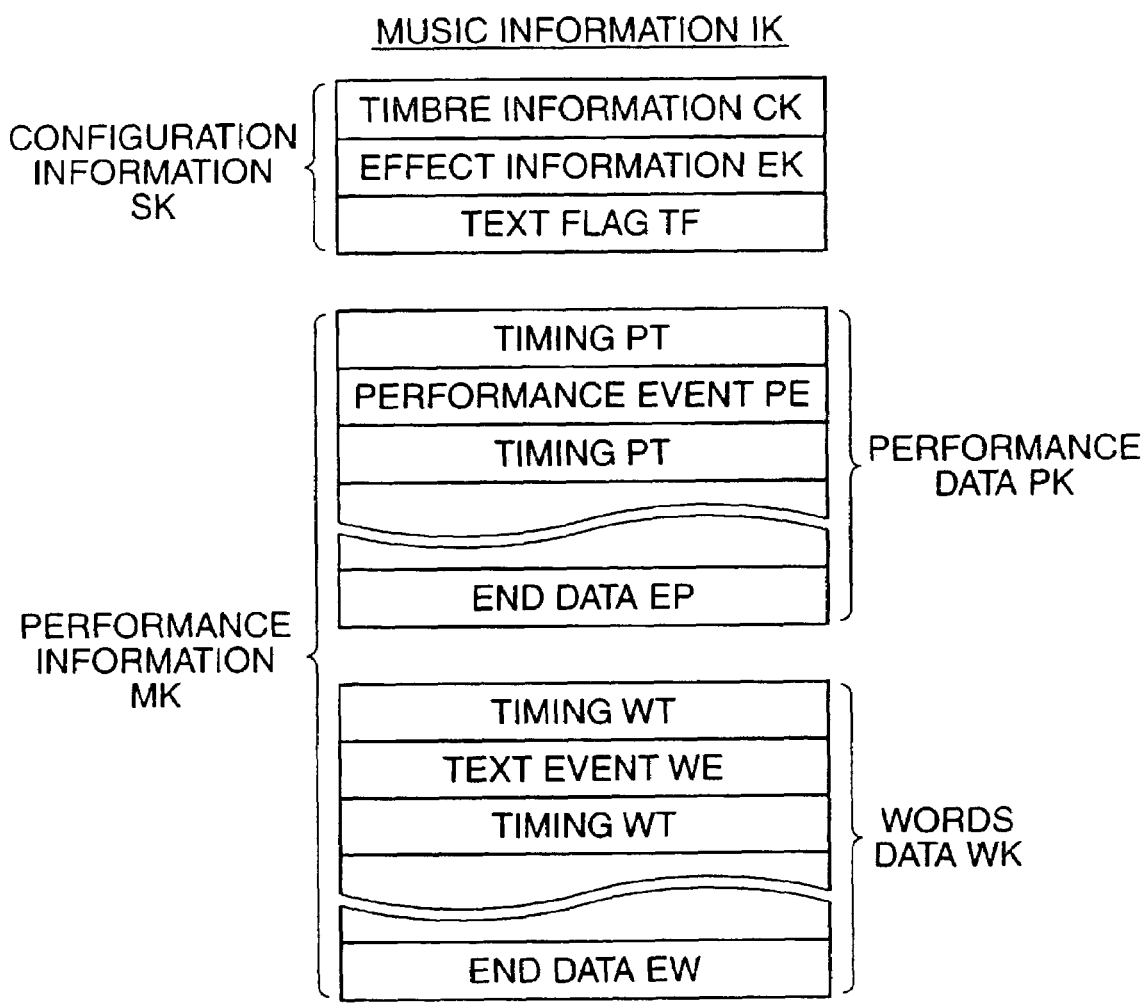
FIG. 15 is an example of a music information format usable in the karaoke mode in the portable terminal apparatus.

Example of Music Information Format:

Referring to FIG. 15, there is shown an example of a music information format usable in the karaoke mode in the portable terminal apparatus. Music information IK applicable to the karaoke mode for one song compliant to own model format A is composed of configuration information SK and performance information MK, the latter being composed of performance data PK and words data WK. The configuration information SK includes timbre information CK including timbre number and timbre parameter and effect information EK including effect parameter and effect program, like the above-mentioned configuration information SA. The configuration information SK has a text flag TF as other information, the text flag TF being indicative that the words data WK are recorded in the performance information MK. It should be noted that the information to be recorded as the performance data PK and the words data WK is preferably the information in one interval (for example, a portion of bridge) of one song.

The performance data PK indicative of music progression are equivalent in content to the above-described performance information MA, which is the information recording timing data PT and performance event PE in the order of performance and ending with end data EP. The performance event PE is a collection of key numbers and gate times. The words data WK indicate the words for the performance data (a song) included in the performance information IK and record, in the sequence of music progression, timing data WT indicative of display timing and text event data WE indicative of the words to be displayed, ending with end data EW. The timing data WT included in the words data WK are synchronized with the timing data PT included in the performance data PK so that each text event WE is displayed in synchronization with music performance.

Like the above-described music information IA, IB, and IC, the music information involving words data may be one received from the outside. When receiving the music information from the outside, not only the performance data (the music progression data) but also the words data are compressed and format-converted into the words data WK for own model as with the above-mentioned embodiments. Consequently, the received music information is stored in block KB3 along with a control command. In doing so, on the basis of the timing data PT of the performance data PK, the performance event PE is sent to a route to the tone generator 24 or 36 (refer to FIGS. 2 and 3) of the sounding controller 8 and, on the basis of the timing data WT of the words data WK, the text event WE is sent to a route to the display circuit 5 (refer to FIG. 1).

The controller block KB3 controls the sending of the information passed from the information separation block KB2 in accordance with the control command. To be more specific, if the control command specifies the reproduction of a melodious ringing tone, only the performance event PE is sent to a tone generator block KB4; if the control command specifies the display of words (the karaoke capability), the performance event PE and the text event WE (or only the text event WE) are sent to the tone generator block KB4 and a display circuit block KB5 respectively. Then, the tone generator block KB4 and the display circuit block KB5 are driven by the received performance event PE and the received text event WE respectively, executing music performance and words display.

Figure 17:
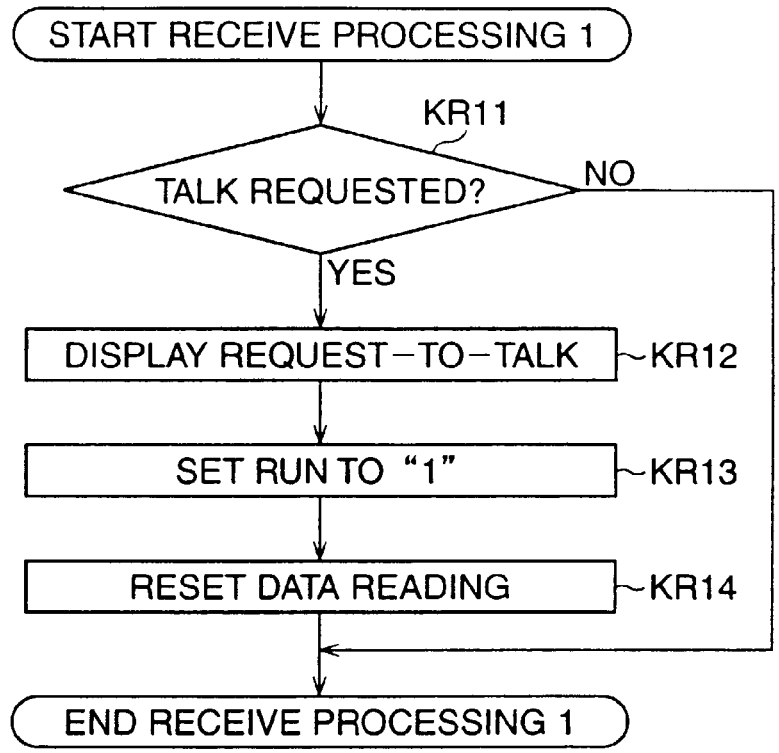
FIG. 17 is a flowchart of "receive processing 1" which is an example of the receive processing in the terminal system according to the invention.

Receive Processing 1:

Referring to FIG. 17, there is shown a flowchart of "receive processing 1" which is an example of the receive processing (step TR3 shown in FIG. 12) in the terminal system according to the invention. The receive processing 1 can instruct the start of reproducing a melodious ringing tone upon request from another terminal for talk even if the terminal system TS is operating in one of the various modes including the karaoke mode.

In step KR11, which corresponds to talk request acknowledge processing in the normal portable telephony, the main CPU 1 determines whether there is a request to talk from another terminal. If the request to talk is found, the CPU 1 displays information thereof in step KR12 and goes to step KR13. If there is no request to talk, the CPU 1 ends this receive processing 1. The displaying of the information indicative that there is a request to talk in step KR12 is made by displaying a request-to-talk icon on the display 13 or flashing the already displayed request-to-talk icon. This prevents a melodious ringing tone from sounding while the user is looking at karaoke words for example.

In step KR13, the CPU 1 sets a RUN flag indicative of a ringing melody music reproduced state to "1" and, in step KR14, resets the current data read operation to forcibly pause the current mode before entering the talk mode, setting the reading of ringing melody music. For example, if the current mode is the karaoke mode, the CPU 1 resets the reading of the performance data PK and the words data WK and, before entering the talk mode, erases the currently displayed words and muting the currently reproduced music, forcibly pausing the current mode. It should be noted that the current mode may be forcibly ended before entering the talk mode. On the other hand, as for the ringing melody music, the CPU 1 executes necessary settings on the basis of the configuration information in the music information selected as the melodious ringing tone and sets the data read position to the beginning of the performance data.

Figure 18:
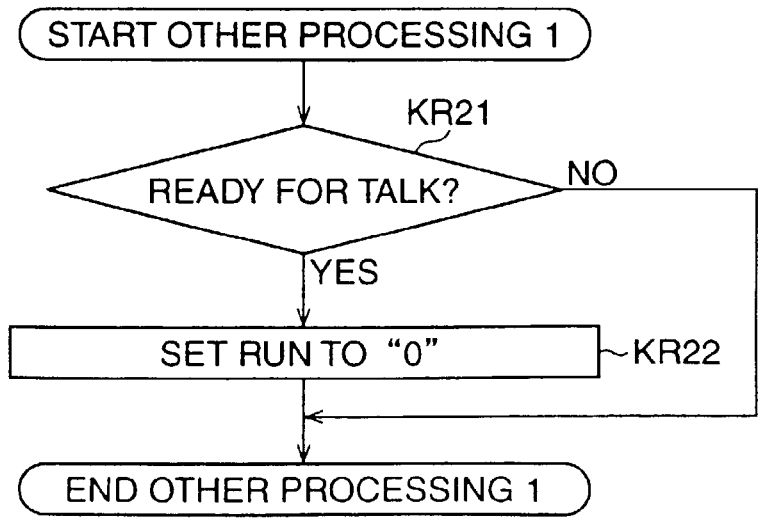
FIG. 18 is a flowchart of "other processing 1" which is an example of the other processing in the terminal system according to the invention.

Other Processing 1:

Referring to FIG. 18, there is shown a flowchart of "other processing 1" which is an example of the other processing (step TR6 shown in FIG. 12) in the terminal system according to the invention. The other processing 1 can instruct the end of the ringing melody music reproduction in response to the operation made by the user for starting talking. In step KR21, which corresponds to the talk start processing in the normal portable telephony, the CPU 1 determines whether the system is ready for entering the talk mode. If the system is found ready, then the CPU 1 goes to step KR22 to set the RUN flag to "0" to reset the reproduction of the ringing melody music; if the system is not ready, the CPU 1 ends the other processing 1.

Figure 19:
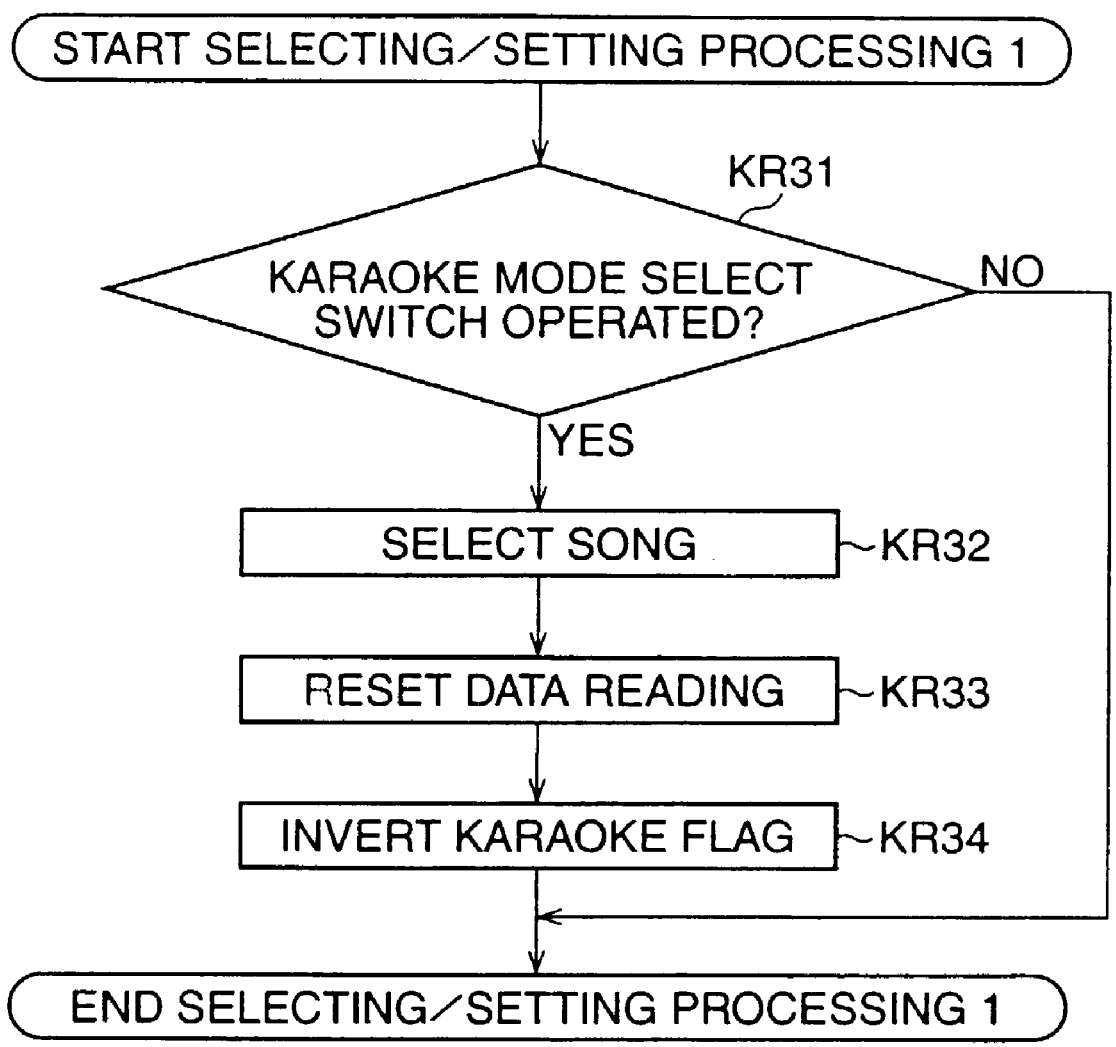
FIG. 19 is a flowchart of "selection/setting processing 1" which is an example of the receive processing in the terminal system according to the invention.
Figure 20:
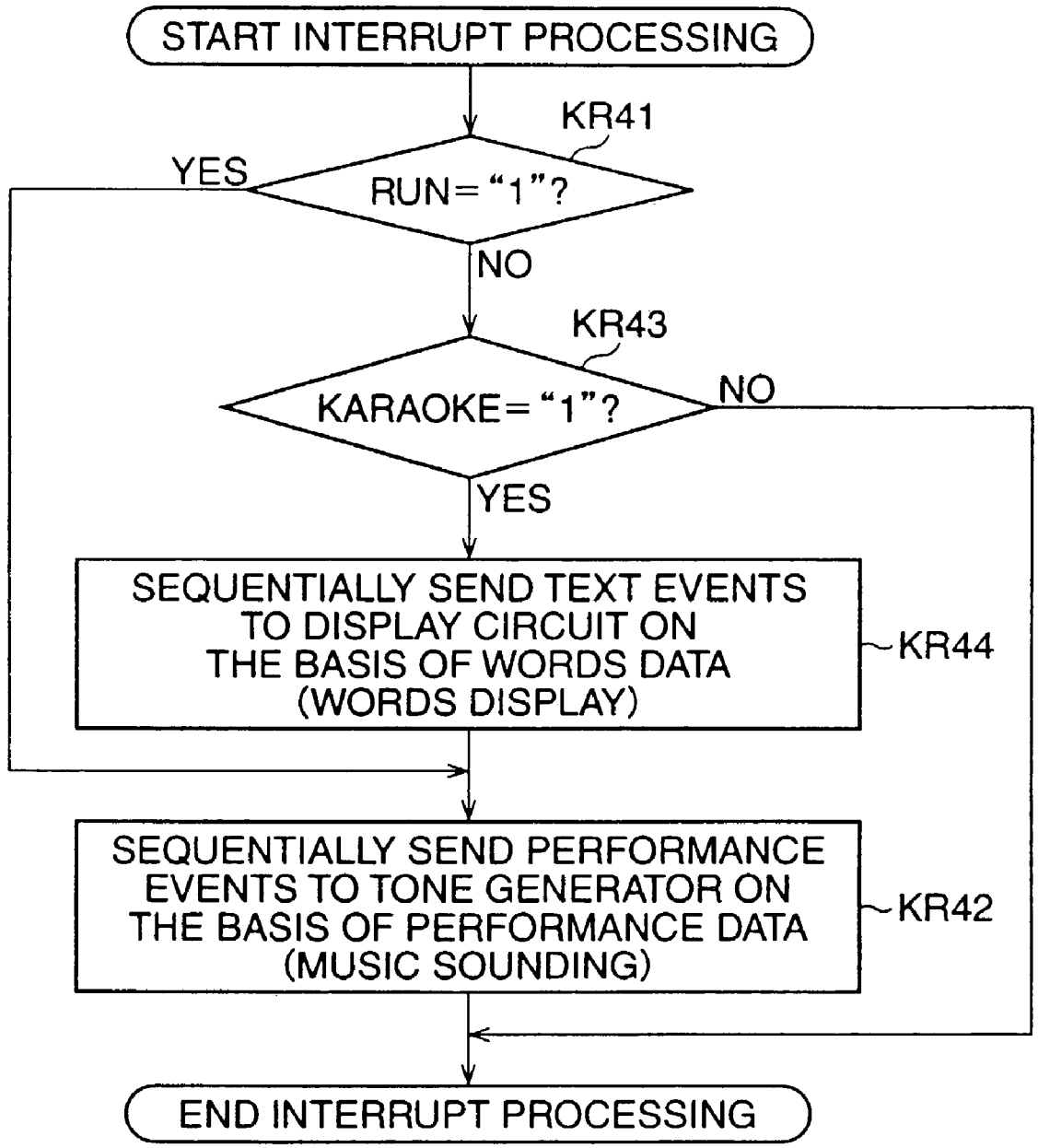
FIG. 20 is a flowchart of "interrupt processing 1" which is an example of the interrupt processing in the terminal system according to the invention.

Selection/Setting Processing 1:

Referring to FIG. 19, there is shown a flowchart of "selection/setting processing 1" which is an example of the receive processing (step TR4 shown in FIG. 12) in the terminal system according to the invention. This selection/setting processing 1 can allows the user to start the karaoke mode by operating the karaoke mode select switch on the operator section 12 of the portable telephone terminal (the terminal system) TS. When starting of the karaoke mode is instructed by this processing, the reproduction of music and the display of karaoke song words (text) start.

In step KR31, the CPU 1 determines whether the karaoke mode has been set by the operation of the karaoke mode select switch. If the karaoke mode is found set by the karaoke select switch, the CPU 1 goes to step KR32; otherwise the CPU 1 ends the selection/setting processing 1 immediately. In step KR32, the use selects a song to be reproduced from the internal ROM. In this case, if the words data for the selected song are not found in its music information, information thereof is displayed. If no song selection is executed, the CPU 1 sets the music information currently set as a melodious ringing tone as the selected music.

Figure 16:
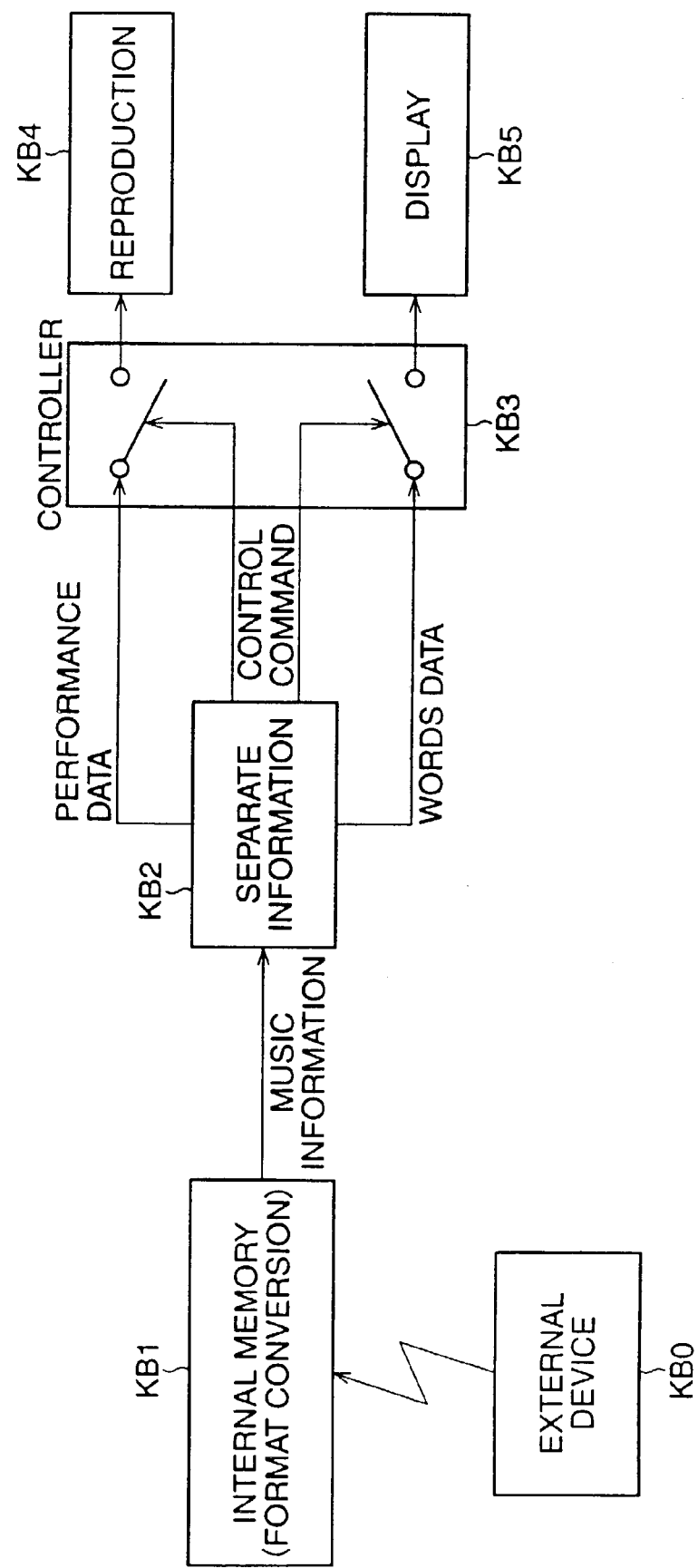
FIG. 16 is a functional block diagram illustrating synchronization between music performance and words display in the terminal system practiced as one embodiment of the invention.

In step KR33, the CPU 1 resets the reading of the currently used data to pause the current mode. In step KR34, the CPU 1 inverts a KARAOKE flag indicative of the karaoke mode, thereby ending this selection/setting processing 1. When the KARAOKE flag is set to "1", it data of the music information selected as the melodious ringing tone, at the time of a request to talk or sounding a request-to-talk voice. In this case, the progression timing of the music is counted by another interrupt processing operation. It should be noted that, during sounding of the melodious ringing tone, the setting of the karaoke mode (the KARAOKE flag="1") is ignored and the words display by the display circuit 5 (refer to FIG. 1, KB5 shown in FIG. 16) is automatically prevented from progressing.

On the other hand, if the RUN flag is found "0" in step KR41, the CPU 1 goes to step KR43 to determine whether the KARAOKE flag is "1". If the KARAOKE flag is found "1", the CPU 1 goes to step KR44; otherwise, the CPU 1 ends this interrupt processing 1.

In step KR44, the CPU 1 sequentially sends text events to the display circuit 5 (refer to KB5) on the basis of the words data to sound a corresponding tone and goes to step KR42. To be more specific, when the RUN flag is "0" (the melodious ringing tone not reproduced) and the KARAOKE flag is "1", it indicates that the karaoke mode is on. In step KR44, the CPU 1 displays words in accordance with the words data WK of the selected karaoke song. In step KR45, the CPU 1 reproduces the song in accordance with the performance data PK of the selected karaoke song. Therefore, when the RUN flag is "0" and the KARAOKE flag is "1", the processing operations in both steps KR44 and KR45 allow the CPU 1 to synchronously execute music reproduction and words display in accordance with the performance data PK and words data WK of the selected karaoke song.

Namely, as for the performance data PK, the timing data PT and the performance event PE recorded in the order of performance are sequentially read to reproduce music. As for the words data WK, the timing data WT and the text event data WE recorded in the order of display are sequentially read to display words. At this moment, the timing data WT indicative of display timing are synchronized with the timing data PT, so that the display of words may be varied in synchronization with music performance. Preferably, the highlighting of words display in this terminal system is easier than the color wiping of character display in ordinary karaoke machines. For example, such highlighting techniques are preferably used as making brighter, as hatching, or as inverting the words to be pronounced or already pronounced of the words of a song currently displayed.

Various Karaoke Modes:

Another karaoke mode may be provided in which only words are displayed without reproducing music. In this case, preferably, the progression of words display may be controlled by the user.

Still another karaoke mode may be provided in which not only the words data and performance data for a part of a song but also those for an entire song may be recorded as performance information. In this case, when reproducing a melodious ringing tone, only a predetermined part (for example, the part of bridge) of a song may be reproduced. At the time of karaoke reproduction, an entire song may be reproduced.

Yet another karaoke mode may be provided in which only the words data may be recorded for an entire song. In this case, in the karaoke reproduction mode ("performance on" mode), only the words corresponding to the performance data may be sequentially displayed. In the words-display-only mode, the words for the entire song may be displayed on the display in accordance with the user operation.

Edit Capabilities:

The terminal system practiced as one embodiment of the invention allows the user to execute various information editing operations by use of the switches on the operator section 12 as described with reference to the information recording/editing module (U5) shown in FIG. 11 and the edit processing (refer to TR5) shown in FIG. 12. The following describes some specific examples of the edit processing.

An edit mode select switch and various edit switches are included in the operator section 12 (refer to FIG. 1) of the terminal system TS. These switches may be arranged as the switches dedicated to editing operations or the existing switches may be diverted to the edit switches. For example, every time the edit mode select switch is operated, edit mode and non-edit mode may be switched between. In the edit mode, the numeric keys for inputting telephone numbers may be used to select information to be edited or set edit parameters (the numeric key mode may be selected by another key between information selection and parameter setting).

Figure 21:
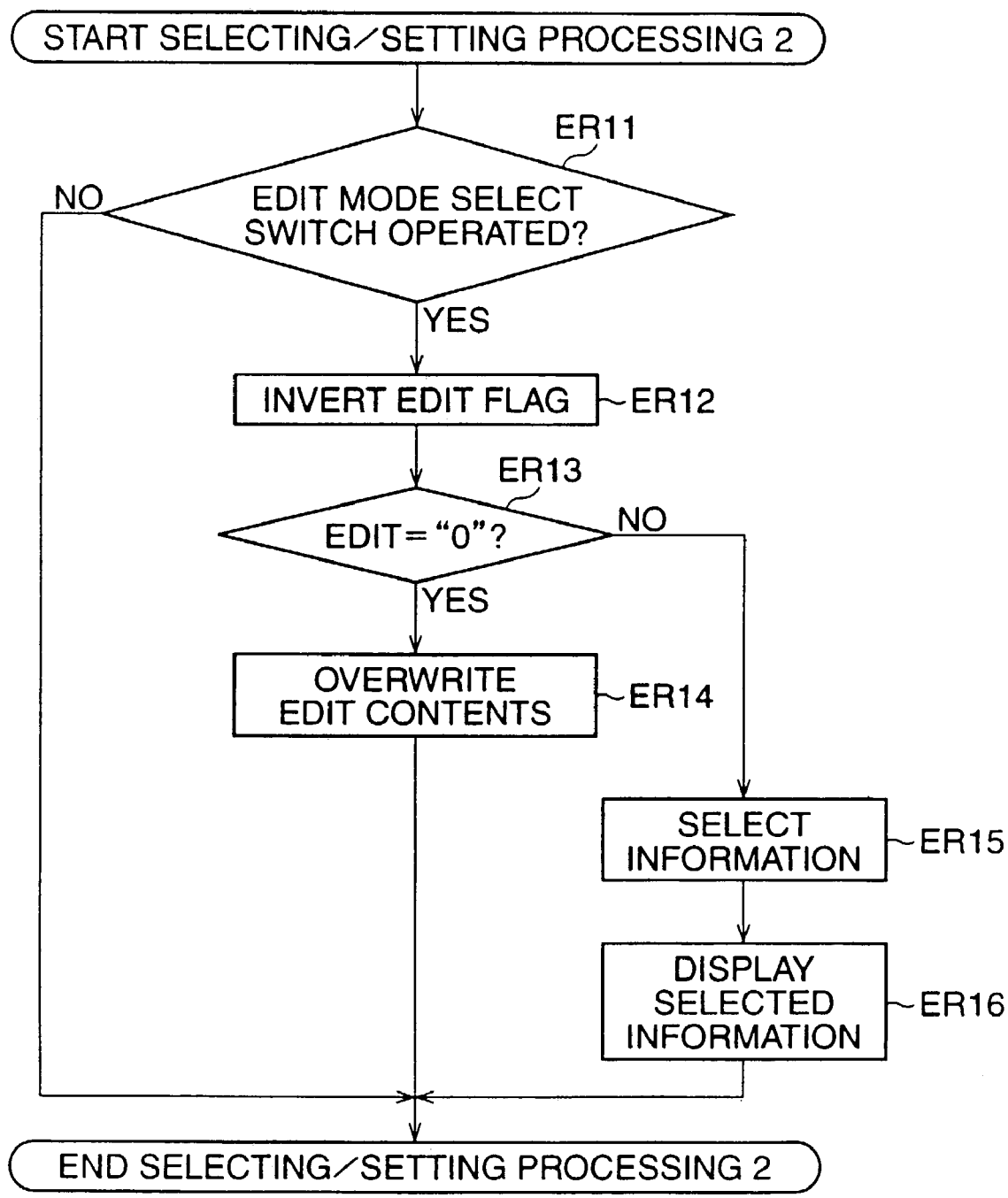
FIG. 21 is a flowchart of "selection/setting processing 2" which is another example of the selection/setting processing in the terminal system according to the invention.

Selection/Setting Processing 2:

Referring to FIG. 21, there is shown a flowchart of "selection/setting processing 2" which is another example of the selection/setting processing (refer to step TR4 shown in FIG. 12) in the terminal system according to the invention. In step ER11, the CPU 1 determines whether the edit mode select switch on the operator section 12 of the portable telephone terminal (the terminal system) TS has been operated. If the edit mode select switch is found operated, the CPU 1 goes to step ER12; otherwise, the CPU 1 immediately exits this selection/setting processing 2.

The edit mode select switch is operated to instruct the start and end of the edit mode. Every time this switch is operated, the settings of an EDIT flag alternate. When the EDIT flag is "1", it indicates that the edit mode is on; when the EDIT flag is "0", it indicates that the edit mode is off (a non-edit mode is on). Only one mode can be set at a time. For example, if the karaoke mode is on (the KARAOKE flag="1") when the edit mode select switch is operated, the karaoke mode is forcibly ended.

In step ER12, the CPU 1 inverts the EDIT flag and goes to step ER13. In step ER13, the CPU 1 determines whether the EDIT flag is "0". If the EDIT flag is found "0" (a non-edit mode is on), the CPU 1 goes to step ER14 to write the edited contents over the selected information, ending the selection/setting processing 2. If the EDIT flag is found "1" (the edit mode is on), the CPU 1 goes to step ER15. When ending the edit mode by the processing of step ER14, the edit contents stored in a temporary storage area in the main RAM 3 can be overwritten for storage.

In step ER15, the CPU 1 switches the input mode of the numeric keys on the operator section 12 of the terminal system TS to "information selection" side. When the user specifies, by operating the numeric keys, the information to be edited from among timbre information, effect information, performance data, and words data for example, the specified information is selected. If the user specifies no information, the CPU 1 sets as the edit information the timbre information or performance data of a song set as a melodious ringing tone. In next step ER16, the CPU 1 displays a part (for example, the start of the song) of the selected (or set) information on the display 13, ending the selection/setting processing 2.

Figure 22:
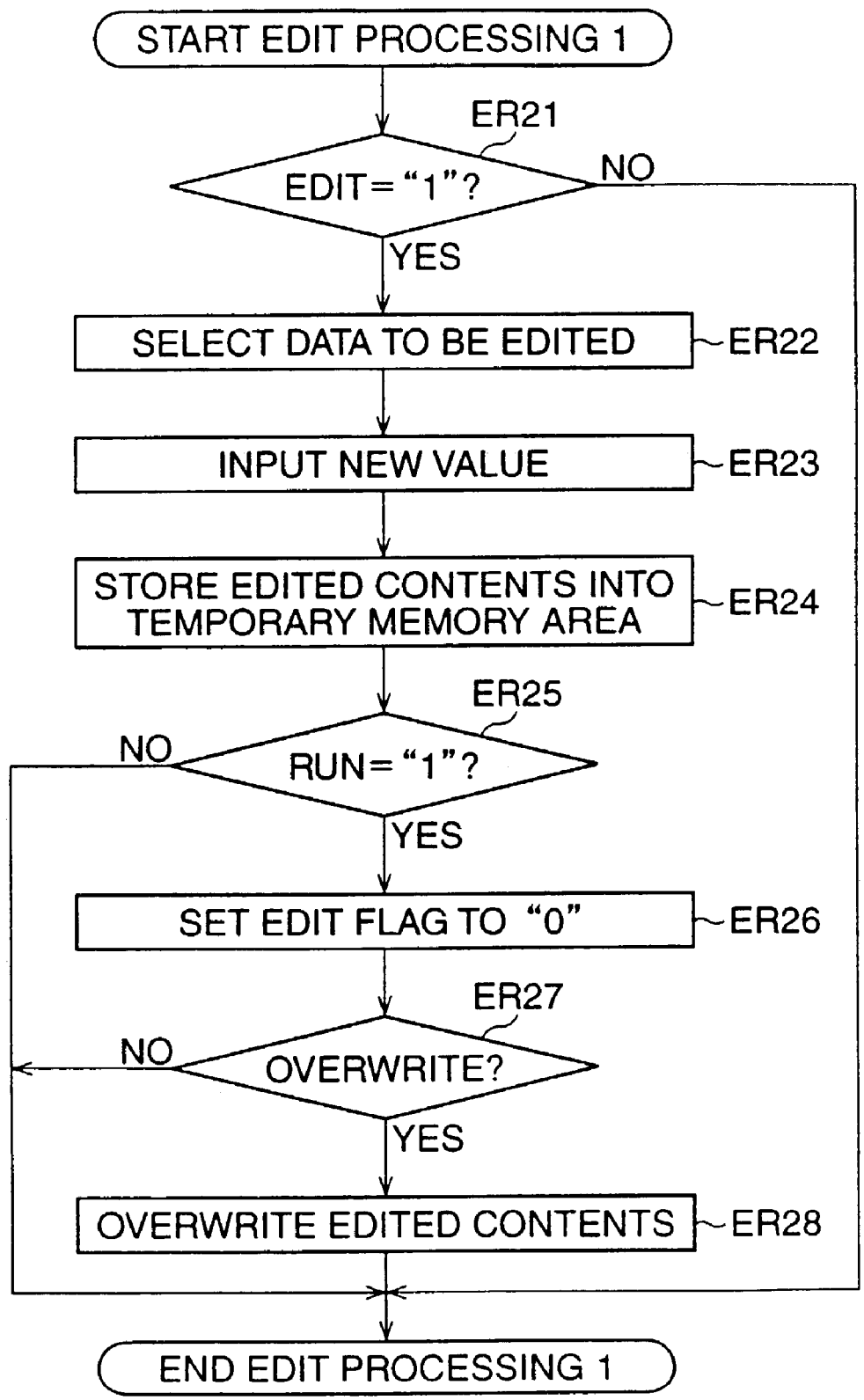
FIG. 22 is a flowchart of "edit processing 1" which is an example of the edit processing in the terminal system according to the invention.

Edit Processing 1:

Referring to FIG. 22, there is shown a flowchart of "edit processing 1" which is an example of the edit processing (refer to step TR5 shown in FIG. 12) in the terminal system according to the invention. In step ER21, the CPU 1 determines whether the EDIT flag is "1". If the EDIT flag is found "1", the CPU 1 goes to step ER22 in which the user selects data to be edited. If the EDIT flag is found "0", the CPU 1 immediately exits this edit processing.

In step ER22, the user operates the data select switch and so on of the operator section 12 to sequentially change the contents displayed on the display 13, displaying such data values to be edited as parameters, musical notes, and timings. In next step ER23, the user starts a specific edit operation, in which the user switches the input mode of the numeric keys for inputting telephone numbers on the operator section 12 from "information selection" to "parameter setting". Here, the user inputs new parameter values, add new data, delete existing data, or executes other parameter setting operations.

In step ER24, the CPU 1 stores the edited contents in the temporary area of the main RAM 3 and goes to step ER25. It should be noted that the temporary stored edited contents are written over the actual data at the end of the edit mode. However, this overwriting may be executed during the edit mode.

In step ER25, the CPU 1 determines whether the RUN flag is "1". If the RUN flag is found "1" (the melodious ringing tone being reproduced), then the CPU 1 sets the EDIT flag to "0" in step ER26 and goes to step ER27; otherwise (the RUN flag="0", the melodious ringing tone not being reproduced), the CPU 1 ends the edit processing 1. In step ER27, the CPU 1 determines whether to overwrite the edited contents. If the edit contents are to be overwritten, the CPU goes to step ER28 to execute the overwriting and then ends the edit processing 1. Otherwise, the CPU 1 immediately ends the edit processing 1.

If a request to talk comes during the edit mode, the edit mode is forcibly ended. Whether the edited contents made so far are to be preserved or not is left to the discretion of the user in step ER28. For example, the display 13 shows a prompt for overwriting or preservation. In this case, a YES/NO operating switch on the operator section 12 may be used for the selection between overwriting and preservation. Preferably, while this prompt is displayed, the CPU 1 does not start the melodious ringing tone sounding processing.

As described with the receive processing 1 (refer to FIG. 17, step KR12), when a request to talk comes during edit mode (or other modes), the icon indicative that the request to talk has come is shown on the display 13. In this case, a melodious ringing tone may be made sound instead of showing the icon. However, the sounding may startle the user, so that it is preferable to inform the user of the request to talk by icon.

It should be noted that the edit mode not only can edit already stored information but also can newly create and store information such as timbre information, effect information, and words data.

Figure 23:
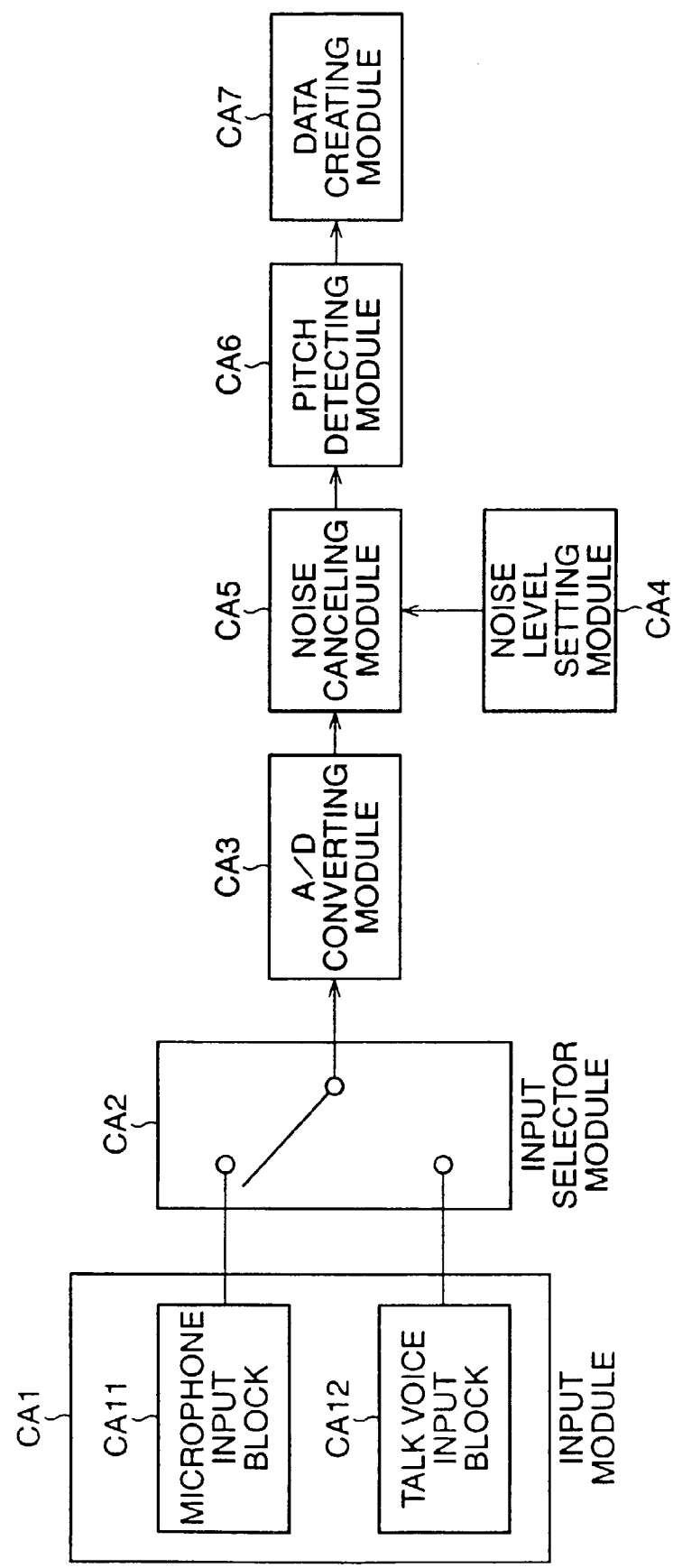
FIG. 23 is a functional block diagram illustrating the voice composing capability of the terminal system according to one embodiment of the invention.

Voice Composing Capability:

In the terminal system according to one embodiment of the invention, music information can be created from the voice inputted in the terminal system as mentioned as the first example of the automatic composing capability in the other processing (refer to FIG. 13, step TR6). The following describes the voice composing capability. Referring to FIG. 23, there is shown a functional block diagram illustrating the voice composing capability of the terminal system according to one embodiment of the invention. The processing for realizing the voice composing capability illustrated by this functional block diagram is basically executed as instructed by the main CPU 1. This processing may alternatively be executed by the CPU of the sounding controller like the CPU 31 of the sounding controller 8 shown in FIG. 3.

An input module CA1 comprises a microphone input block CA11 for capturing a voice (or a singing voice) inputted from the microphone 14 (refer to FIG. 1) of the portable telephone terminal (the terminal system) TS (refer to FIG. 1) and a talk voice input block CA12 for capturing a talk voice (a singing voice of the other party on the telephone) received through the receiver/transmitter 6, capturing the microphone input voice or the talk input voice as a data source.

An input selector module CA2 selects between the microphone input voice and the talk input voice as the data source when the user operates the numeric key for input telephone numbers on the operator section 12. An A/D converting module CA3 converts the format of a data source input voice from analog to digital.

A noise level setting module CA4 sets the level of a noise included in the data source voice supplied from the input module CA1 by means of the following processing:
(1) A prompt for waiting before input is shown on the display 13 for example, asking the user to wait a predetermined duration of time before inputting his or her voice into the microphone or inputting the talk voice. During this wait time (soundless time), the sound inputted in the input module is detected as noise (the noise detection capability).
(2) The maximum level of the detected noise is set as a noise level (the maximum noise level) (the setting capability).

When the above-mentioned processing has been completed, the noise level setting module CA4 shows a prompt for input on the display 13 for example, asking the user for inputting his or her voice through the microphone or inputting the talk voice. A noise canceling module CA5 deletes the voice information below the maximum noise level set by the noise level setting module CA4 from the data source input voice converted into digital format by the A/D converting module CA3.

A pitch detecting module CA6 extracts a pitch sequence from the noise-deleted data source input. The pitch sequence is extracted by frequency analysis for example. In addition, in order to reduce the size of information to be recorded, if generation of plural sounds within a predetermined time is recognized, the sounds following the beginning sound are all deleted. To be more specific, a shortest sound provides a predetermined duration (for example, an eighth note) and the sounds shorter than this predetermined duration are all deleted. If the pitch sequence is found not reaching a predetermined interval, it is preferable to arrange a transposing capability for totally transposing the detected pitch sequence up to the predetermined interval. Such a transposing capability can automatically convert a low-interval input sound into an interval at which the input sounds becomes available as a melodious ringing tone.

A data creating module CA7 converts the pitch sequence detected by the pitch detecting module CA6 into the information corresponding to own model format A and stores the resultant information in the main RAM 4 or the sound control RAM 35.

Figure 24:
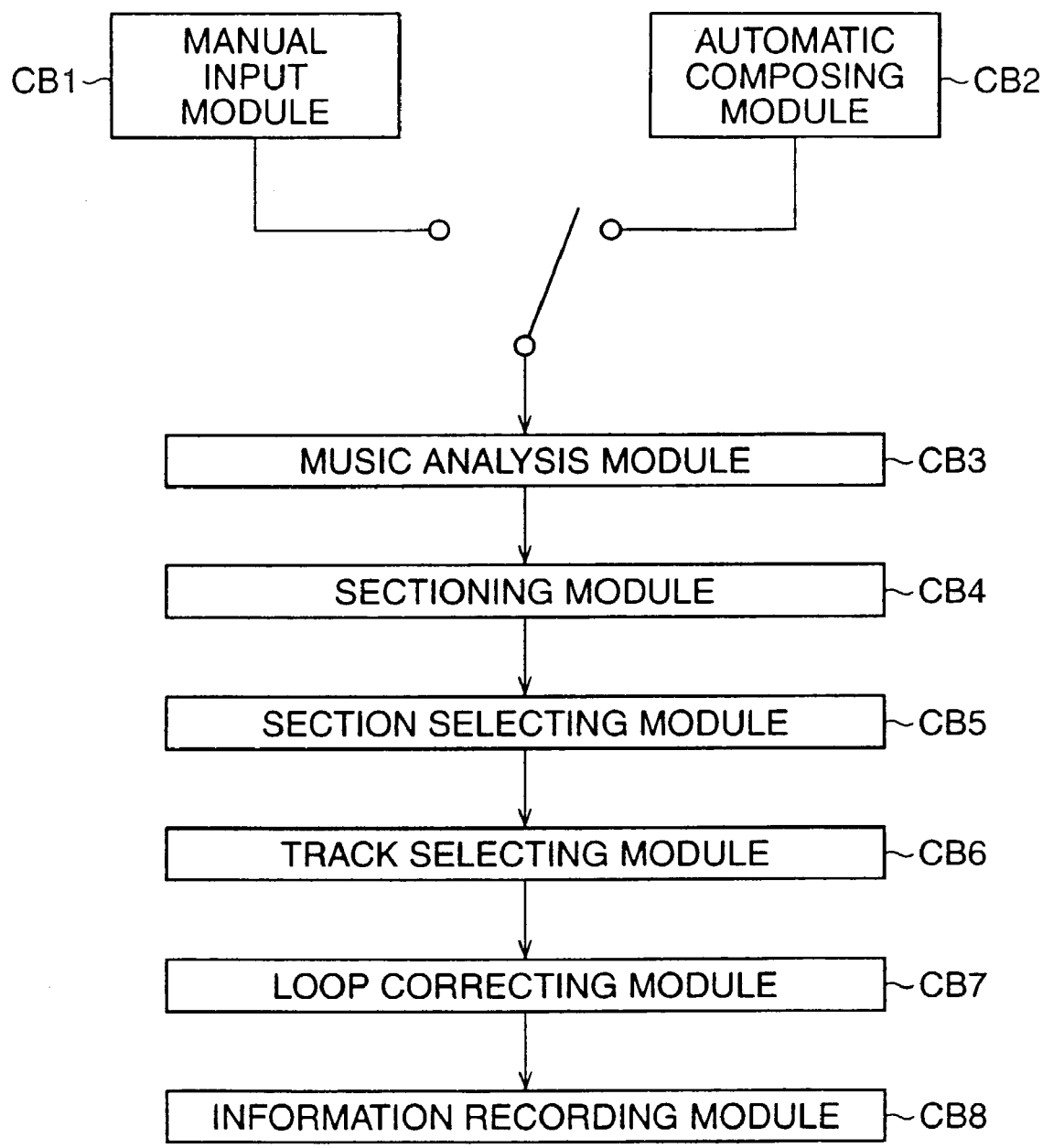
FIG. 24 is a functional block diagram illustrating the automatic composing capability of a personal computer terminal for example according to one embodiment of the invention.

Automatic Composing Capability 1:

In the system according to one embodiment of the invention, an automatic composing capability can be realized as described with reference to the newly creating module (P3 shown in FIG. 10) on the personal computer PC side. Referring to FIG. 24, there is shown a functional block diagram illustrating the voice composing capability according to one embodiment of the invention. The processing for realizing the automatic composing capability shown in this functional block diagram is basically executed by the personal computer terminal PC (P3 shown in FIG. 10). It will be apparent that this automatic composing capability may be installed on the terminal system TS.

A manual input module CB1 allows the user to input (or create) music information in the following manner by use of a conventional sequencer (or a personal computer having a sequencer) for example:
(1) Inputting music information by playing the electronic musical instrument connected to the sequencer.
(2) Creating music information by inputting numerals for example by use of a keyboard and/or a mouse connected to the personal computer terminal PC by looking at the input screen on the display device connected to the PC.

(3) Creating the music information for one piece of music by coupling plural pieces of prepared partial music data (pattern data).

On the other hand, in an automatic composing module CD2, the user inputs partial data for a piece of music to be composed. This input is made by actually playing the electronic musical instrument or by use of the display screen of the personal computer terminal PC. Plural pieces of partial music data (pattern data) may be prepared in the personal computer terminal PC for selecting the data for composing music. After inputting the partial music data as described above, the music information for one piece of music is automatically created by use of a known automatic music creating technique.

The music information created by the manual input module CB1 or the automatic composing module CB2 or the music information stored in the personal computer terminal PC is inputted in a music analysis module CB3. The music analysis module CB3 analyzes the inputted music information in order to divide the music information for one piece of music into musical sections such as an introduction part, a fill-in part, a main part, and an ending part for example.

A sectioning module CB4 divides the music information into plural pieces of sectional information on the basis of the analysis result provided by the music analysis module CB3. A section selecting module CB5 automatically selects one of the plural pieces of sectional information for use as a melodious ringing tone or BGM. For this selection, the plural pieces of sectional information may be displayed on the screen to allow the user to listen to each piece on a trial basis.

In a track selecting module CB6, if a selection piece of sectional information is made up of plural tracks (or parts), the number of these tracks is narrowed down to a minimum. For example, if there are plural parts which are played in a similar timbre, only one of them is used, the information about the other being deleted.

In a repetition correcting module CB7, if a certain piece of sectional information completed with the processing operations up to and including the track selecting processing (CB6) is reproduced repeatedly, a tone at the start of that section or a tone at the end of the section (or a tone in proximity) is corrected so that the tone at the start of the section and the tone at the end of the section are linked smoothly. Lastly, an information recording module CB8 stores the created sectional information into the storage area (RAM) of the personal computer terminal PC and outputs it to the information compressing module P4 shown in FIG. 10.

Figure 25:
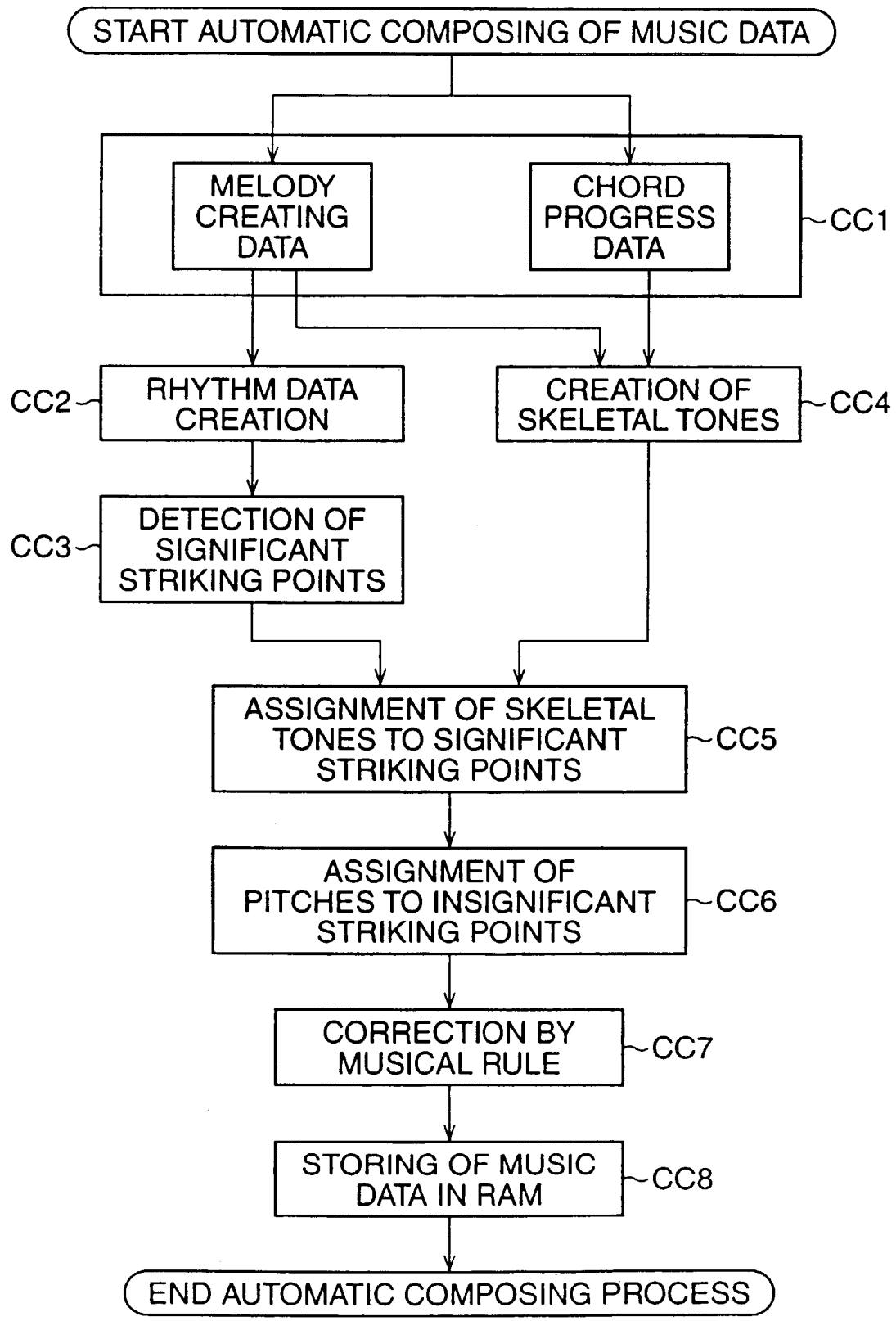
FIG. 25 is a flowchart schematically illustrating a method of automatically creating music data in a potable terminal apparatus practiced as one embodiment of the invention.

Automatic Creation of Music Data (Automatic Composing Processing):

In a system practiced as one embodiment of the invention, the terminal system TS or personal computer terminal PC can automatically create music data. This allows automatic composing capabilities to be realized as described in other processing in its own TS terminal (FIG. 12: step TR6), or in new creation processing in the PC terminal (FIG. 10: newly creating module P3; FIG. 14: step PR3). FIG. 25 is a flowchart schematically illustrating a method of automatically creating music data in the potable terminal apparatus practiced as one embodiment of the invention. This method allows music data adapted to user preferences such as atmospheres to be automatically created in the potable terminal system TS. The automatic creation processing of music data (automatic composing processing) as shown in the processing flow is executed in the terminal system TS, but it may be executed in the personal computer terminal PC, or it can be applied to the automatic composing module CB2 shown in FIG. 24.

In the method, shown in FIG. 25, for automatically creating music data adapted to user preferences in the potable terminal system TS, plural kinds of melody creating data and code progressing data are prestored for each feeling of music in the main ROM 2 or main RAM 3. The melody creating data and chord progress data may be received from the server BS through the receiver/transmitter 6, or from an external device through the communication interface 10, or it may be downloaded from the detachable small-size recording medium 19 through the connecting circuit 9.

According to the automatic creation processing of music data, a pair of melody creating data and chord progress data is selected (for example at random) from the plural kinds of melody creating data and chord progress data for the feeling selected by the user. On the basis of these data, and according to user preferences, music data are so modified that a melody is automatically created. The process to automatically create a piece of music such as a melody is disclosed in detail in a patent application (Japanese patent application No. 11-019625) filed by the same applicant as that of this application, so the following gives only an outline of the process.

Expressions of feelings of music can include "fresh," "soft," "lonely," "sexy," and so on. Each feeling corresponds to plural kinds of melody creating data and chord progress data. From among the plural kinds of these data corresponding to the feeling selected, a piece of melody creating data and a piece of chord progress data are selected at random, respectively. It should be noted that a specific pair of melody creating data and chord progress data may correspond to each feeling. The melody creating data consist of rhythm creating data and pitch creating data. The rhythm creating data include data pieces indicative of the number of notes (high, moderate, low in number), types of time, the presence of syncopation, the number of bars and a period configuration. The pitch creating data include data pieces indicative of an absolute range of audio frequencies, and pitch variations at a predetermined interval. The chord progress data store therein data indicative of the progression of chords for a piece of music (for example, for 32 bars).

Figure 26:
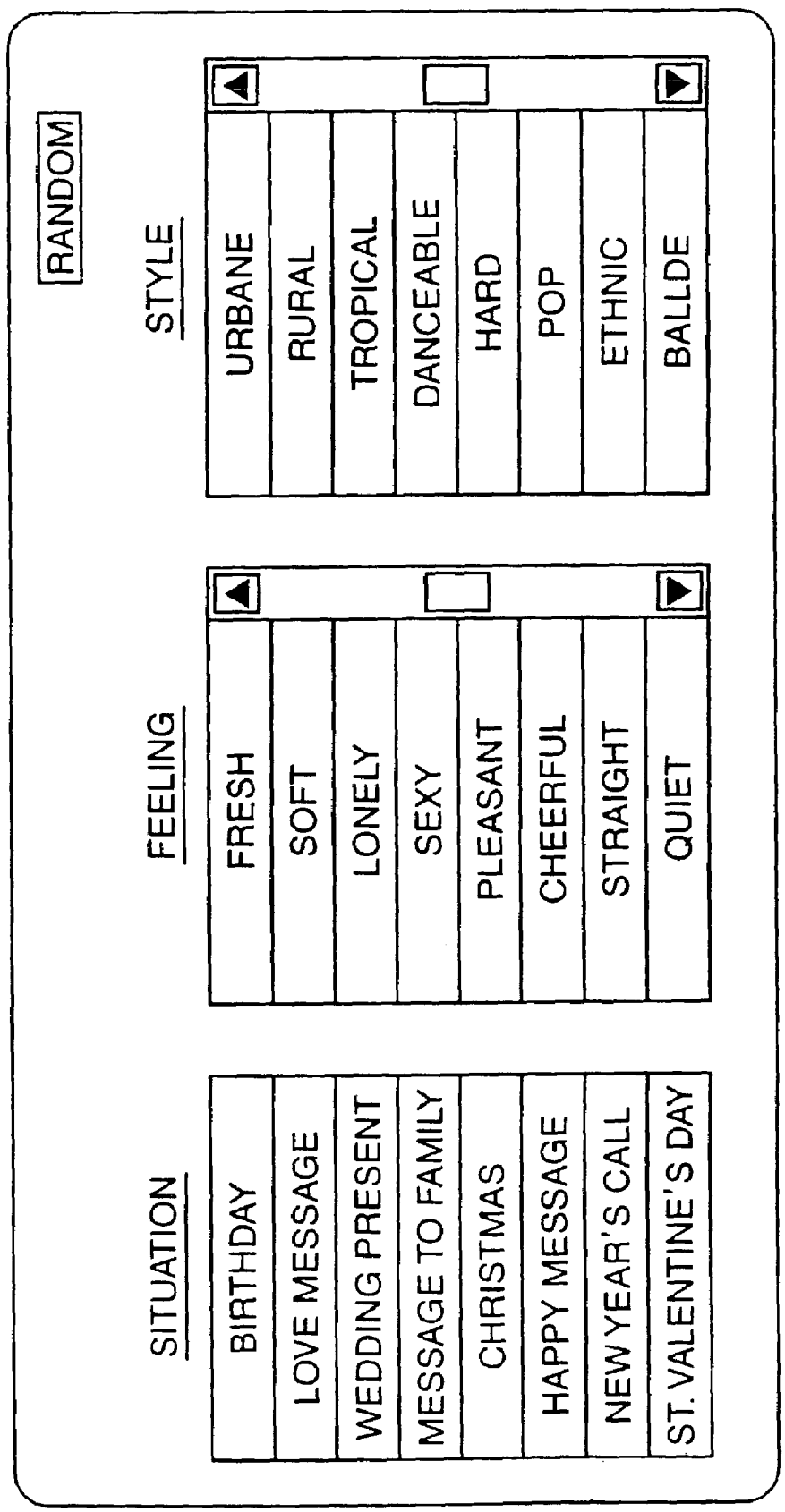
FIG. 26 is a diagram illustrating an example of a musical feeling/style display screen in the potable terminal apparatus practiced as one embodiment of the invention.

Upon automatic creation of music, melody creating data and chord progress data are read out in the first step CC1 of the processing flow shown in FIG. 25. Thus, plural kinds of words and/or icons indicative of feelings of music are displayed on the display 13 for example in response to user's operations (see a middle column in FIG. 26 that shows an example of a display screen for setting parameters associated with automatic composition). When the user selects his or her favorite feeling on the operator section When there are two or more rhythm patterns adapted to the rhythm creating data, any one can be selected at random, or a rhythm pattern may be selected in consideration of the above-mentioned feelings or genres specified separately. Further, the motif rhythm data are not necessarily created automatically. For example, the user may directly enter rhythm data on the operator section 12, or edit the rhythm data automatically created. Alternatively, as discussed above, a note sequence extracted from a voice input from the microphone or a voice input during talking may be used as rhythm data.

Then, in step CC3, significant striking points are detected from all the striking points of the rhythm data created. The term "significant striking point" means musically important striking points in all striking points of a melody. As an example, on-beats, that is, the first and third beats in each bar, or striking points near the first and third beats are detected as significant striking points. The other striking points are detected as insignificant striking points. However, the significant striking points are not limited to the on-beats or the neighborhood striking points, and they may be detected according to other conditions.

On the other hand, in step CC4, skeletal tones of the motif composed of a few bars are created on the basis of the melody creating data and chord progress data. Then, skeletal tones for a piece of music are created by referring to the skeletal tones of the motif and the music configuration data. The skeletal tones of the motif are selected at random as being chord component tones having pitches that meet requirements for the above-mentioned range of audio frequencies and pitch variations. However, this selection is not necessarily carried out at random; it may follow a predetermined rule.

In step CC5, the skeletal tones created in step CC4 are assigned to the significant striking points detected in step CC3. Then, in step CC6, a pitch is assigned to the insignificant striking point between the significant striking points. To be more specific, a pitch on a scale of available notes for a corresponding chord tone is assigned at random to the insignificant striking point. However, this assignment is not necessarily carried out at random; it may follow a predetermined rule. Upon formation of the skeletal tones for a piece of music and the pitch of the insignificant striking point, period marks are reflected in the same manner as in the process of the above-mentioned rhythm creation. In other words, periods bearing the same mark are made identical in pitch to corresponding periods, while periods with similar marks are made identical in pitch in part (for example, in the fist half) to corresponding periods. selected by the user on the operator section 12, or made correspondent to a music style selected at random are read out and modified on the basis of the chord progress data so that pitch data included in the accompaniment data match the chord progress data. The above-mentioned operations are repeated for a piece of music (for example, for 32 bars) to crate the accompaniment parts. Expressions of musical styles include "urbane," "rural," "tropical," "danceable," and so on (see the right column in FIG. 26).

Figure 27:
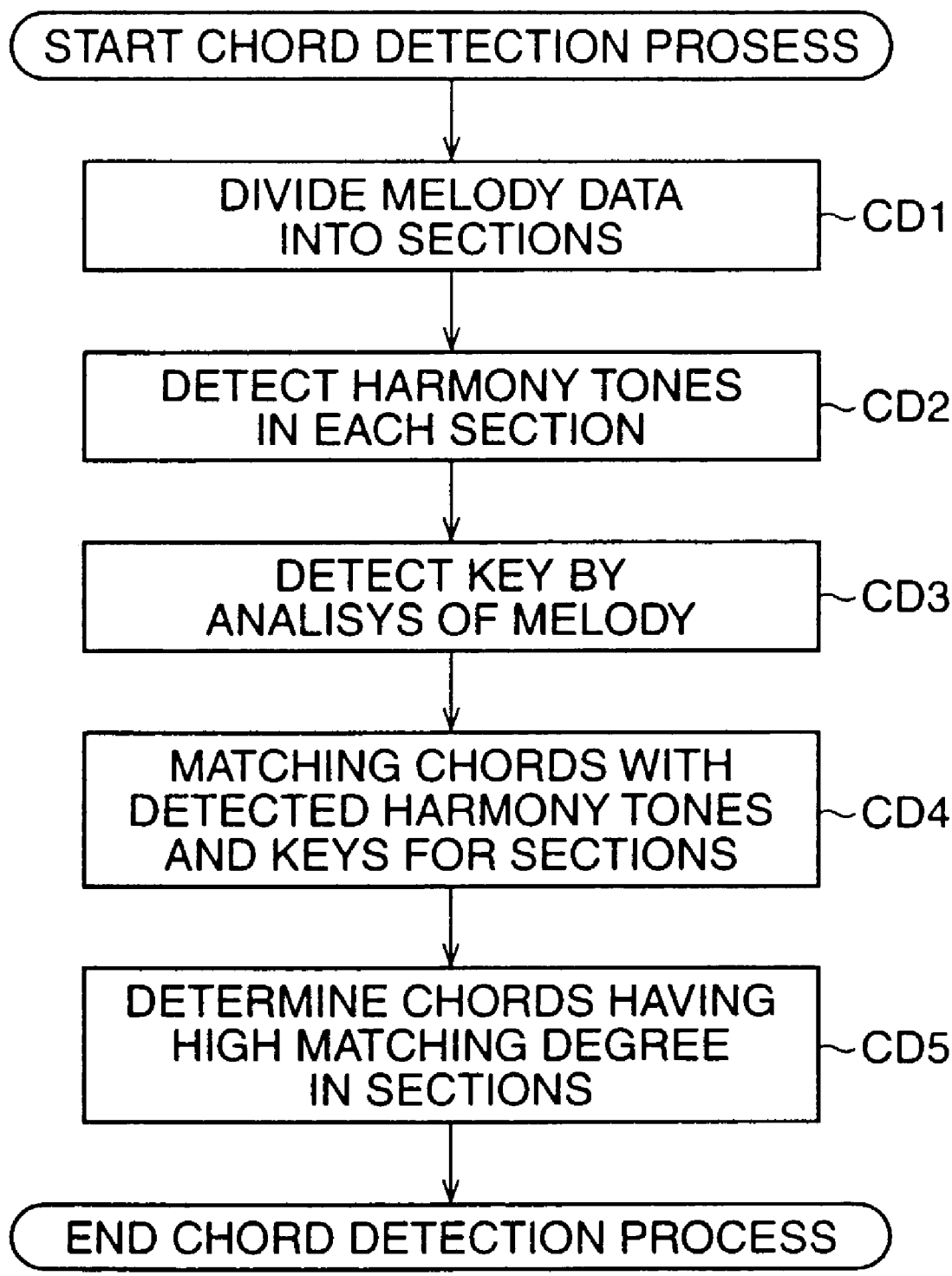
FIG. 27 is a flowchart schematically illustrating a method of automatically deciding a chord fitting music data in the potable terminal apparatus practiced as one embodiment of the invention.
Figure 28:
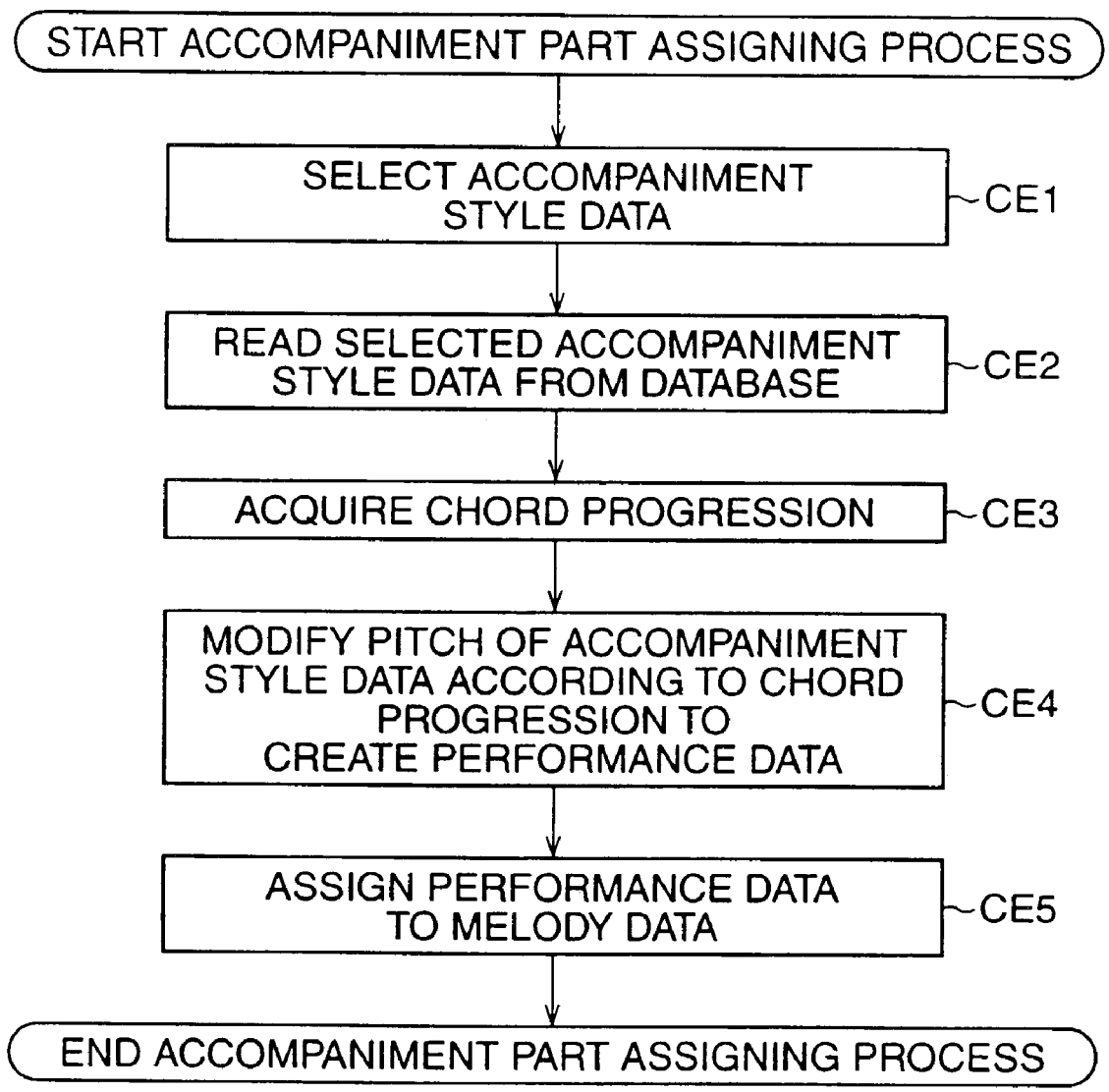
FIG. 28 is a flowchart schematically illustrating a method of assigning accompaniment parts fitting melody data to the melody part in the potable terminal apparatus practiced as one embodiment of the invention.

Chord Detection and Accompaniment Part Assignment:

In one embodiment of the invention, as described as one of automatic composing capabilities (FIG. 12: "other processing" in step TR6), the terminal system TS can automatically create performance information fitting the performance information already created and stored. FIG. 27 is a schematic flowchart explaining a "method of automatically deciding chords (the progression of chords) fitting the music data (chord detection processing)" executed in the portable terminal apparatus practiced as one embodiment of the invention. FIG. 28 is a schematic flowchart explaining a "method of assigning accompaniment parts fitting melody data to the melody data (accompaniment part assigning processing)" executed in the portable terminal apparatus practiced as one embodiment of the invention. The chords (the progression of chords) decided in the chord detection processing of FIG. 27 can be used for automatic assignment of accompaniments executed in the accompaniment part assigning processing.

In the chord detection processing of FIG. 27, melody data are divided in step CD1 into sections according to a predetermined rule. One section divided here is a section in which a chord is considered continuous. The predetermined rule may be the one that divides the melody data into constant sections for example by bar. Alternatively, the rule may be the one that analyzes the arrangement and order of the melody data to detect a range of one-section in which a chord is considered continuous so as to divide the melody data at the detected positions. In these cases, plural rules may be used at the same time.

In step CD2, a harmony tone is detected in each melody section divided. The detection of the harmony tone is carried out by analyzing the arrangement and order of the melody data to detect a tone that is considered to be a harmony tone in each section. Then, in step CD3, the melody is analyzed to detect a key. For example, matching is made between the number of appearances of each tone name in the melody (which may be simply the number of tone names, or the value of each tone name plus its tone length) and a scale tone of each key. As a result, a key the matching degree of which is the highest is detected as the key of the melody.

Then, in step CD4, on the basis of the detected harmony tone and the detected key, matching is made with chords or the progression of chords for every two or more consecutive sections of the melody, or for every section. To be more specific, the progression of chords typically found in consecutive sections (for example, four, three or two sections) is stored for each key in a database. Then, the harmony tones detected in the consecutive sections are compared with component tones in the progression of chords in the detected key. At first, the chords in progress over four sections are compared with the harmony tones in the four sections. If a chord matches a harmony tone, the matching is decided. If there is no cord matched, the number of sections is reduced to three sections, and chords in progress over three sections are compared with harmony tones in the three sections. If there is no chord matched in the three sections, matching is made for two sections. If no chord matched yet, individual harmony component tones are compared with chords in a section, a chord the matching degree of which is the highest is decided.

In step CD5, as a result of the matching processing, a progression of chords or a chord the matching degree of which is the highest is decided to be the cord in the section or sections concerned, and then, the chord detection processing is ended. Each key, however, does not always have the progression of chords. If only a specific key has the progression of chords, tone names of component tones in the progression of chords may be shifted according to keynotes of the key so that the progression of chords will be held substantially in the whole key.

In the accompaniment assigning processing of FIG. 28, accompaniment parts are created on the basis of the progression of chords fitting the melody data and the style data prestored. The style data are performance data of one or more parts from which the accompaniment parts are originated. The performance data include a number of performance data for one or more bars created on the basis of a predetermined chord, for example, C major, and stored in the database. The progression of chords fitting the melody data can be achieved by the above-mentioned various methods. The methods include detection from the melody, pre-storage in the melody data, and user specification to the melody. The melody data including the chord progression may be downloaded from the base station (server) BS.

In the accompaniment assigning processing, the user selects any one of a number of accompaniment data stored. Each piece of accompaniment style data bears a corresponding term (for example, a term indicative of a musical genre such as pop or classical music, or an atmosphere such as "bright" or "dark"). A list of these terms are displayed on the display 13 of the portable terminal apparatus TS so that any term can be selected on the operator section 12 to select corresponding accompaniment style data. Alternatively, a number assigned to each accompaniment style data may be selected by use of numerical switches on the operator section 12.

In step CE2, the selected accompaniment style data are read out from the database. In the following step CE3, a progression of chords is acquired. Further, in step CE4, the pitch of performance data included in the accompaniment style data read out is modified according to the progression of chords acquired in step CE3 to create performance data for the accompaniment parts. The pitch of the performance data is modified by use of a pitch conversion table provided for each type of chord. The pitch conversion table is a table that defines how much the pitch of the performance data should be modified according to the type of chord. The pitch of the performance data is shifted by an amount of modification defined in the table so that a pitch matching the specified type of chord can be obtained.

Then, in step CE5, the performance data for the accompaniment parts created in step CE4 are assigned to the melody data to create a melody composed of two or more parts. After that, the accompaniment assigning processing is ended.

The accompaniment style data may be composed of two or more sections so that the progression of sections can be specified. For example, the sections for the accompaniment data can include an introductory section, a main section, a fill-in section, and an ending section. The arrangement and order of the sections, or the number of repetitions the main section is reproduced can be specified by the user according to the progression of the melody data. Alternatively, section progress data in which the arrangement and order of the sections or the number of repetitions the main section is reproduced are programmed may be prestored. In this case, the section progress data are read out along the progression of the melody data to specify the progression of sections. Thus, performance of accompaniment parts rich in variation can be obtained.

[Various other Embodiments]

The format of the music tone information usable on the portable terminal apparatus is not limited to own model format A. For example, the sounding controller as shown in FIG. 3 may be installed on the portable terminal apparatus to operate, in this circuit, the automatic performance capability (the sequencer) used in conventional electronic musical instruments, thereby reproducing the music information having SMF format C without change. This eliminates the necessity for executing the format conversion when capturing the information from other music information generating apparatus (for example, a personal computer) into this portable telephone terminal. It should be noted that, in this case, the information is compressed preferably.

In the above-mentioned embodiments, FM is used for the tone synthesizing in the tone generator. It will be apparent that the tone synthesizing is not limited to FM. For example, any of wavetable, physical model, harmonics synthesis, formant synthesis, and "VCO+VCF+VGA" analog synthesis are also applicable. Namely, various types of information associated with timbres recorded as configuration information depend on the tone synthesizing scheme used in the tone generator. Basically, however, various types of parameter information corresponding to the tone synthesizing schemes conventionally used in electronic musical instruments may be employed.

The tone generator itself may be constituted by not only dedicated hardware but also "DSP+microprogram" or "CPU+software" combination.

Further, plural sounding channels may be formed by using one circuit in a time-division manner or one channel may form one circuit.

As mentioned above and according to the invention, a portable terminal apparatus capable of sounding tones has a sounding control apparatus that is given a timbre to be set on the basis of timbre-associated configuration information to generate a tone signal corresponding to performance information and impart an effect to be set on the basis of effect-associated configuration information to the generated tone signal. Consequently, two or more tones can be sounded at a time by use of an FM tone generator for example, providing rich and various ringing melodies, BGM during talking,. and music at any time desired.

Control means (CPU), which operates independently of the portable terminal apparatus, is used to generate a tone signal having a predetermined timbre and imparted with a predetermined effect. Consequently, tone signal generation processing can be executed with relatively high degree of freedom without being restricted by the control of the portable terminal apparatus main.

A tone signal imparted with a predetermined timbre and/or effect corresponding to configuration information included in music tone information is generated on the basis of the music tone information and, at the same time, an audio signal and a video signal are generated on the basis of audio information and video information. Consequently, the user can enjoy the reproduced tone in various modes supported by the audio and video signals. In addition, according to the storage size of the storage means used, tone signals are generated by use of music tone information described in a format which is downsized as compared with a general-purpose music tone information format. Consequently, quality tones can be reproduced within the maximum allowable range of the data processing and storage capacities of the portable terminal apparatus without weighing upon the memory of the apparatus.

A music tone information service system is formed by portable terminal apparatus and the base station (server) having a music tone information source. According to the selection information sent from any of the portable terminal apparatus, the base station selects corresponding music tone information from the music tone information source. The base station imparts configuration information indicative of a timbre and/or an effect to be imparted to a tone which is sounded in the portable terminal apparatus. On the basis of the music tone information imparted with the configuration information, the portable terminal apparatus generates a tone signal imparted with the predetermined timbre and/or effect. Consequently, rich and various tones can be provided by effective use of the server database. In addition, this system charging processing is executed to the portable terminal apparatus that sent the selection information, thereby providing appropriate services to the users of particular portable terminal apparatus.

Music tone information is shared by a music tone information processing apparatus based on a personal computer or an intelligent electronic musical instrument. Music tone information of a desired format is created or edited in the music tone information processing apparatus to compress the created or edited music tone information into a size suitable for the portable terminal apparatus. Therefore, the novel constitution facilitates the setting, editing, and creation of timbres and effect of the music tone information suitable for the capacity of the portable terminal apparatus.

Music tone information stored in music tone information sources such as external recording media and telephone terminals is captured in the portable terminal apparatus for editing. Consequently, music tone information of various forms can be processed into the music tone information suitable for the capacity of the portable terminal apparatus or user preferences.

Further, as described and according to the invention, performance information and words information corresponding to the progression of performance are stored beforehand. Tone signals are sequentially generated on the basis of the stored performance information. Words indicative signals corresponding to the generated tone signals are generated on the basis of the words information. Consequently, portable terminal apparatuses such as a portable telephone can provide a karaoke capability. The user can not only sing to the portable telephone functioning as a karaoke machine but also remember karaoke song words by displaying them on the portable telephone for singing practice if desired. In addition, the first performance information, the second performance information, and the words information corresponding to the second performance information may be stored beforehand. On the basis of the second performance information, a second tone signal is generated and, on the basis of the words information, a words indicative signal corresponding to the second tone signal is generated for karaoke reproduction. A first tone signal based on the first performance information is generated before karaoke reproduction. Consequently, karaoke reproduction may be automatically switched to ringing melody reproduction based on the first tone signal and without making the display of the karaoke song words intervene this automatic switching.

As described above, according to the invention associated with changing a tempo, the potable terminal apparatus allows the user to specify a tempo on the operator section of the portable terminal apparatus (main unit) by use of at least one of parameters associated with changing a tempo. The parameters include an absolute value of the tempo, a word indicative of the tempo, a rate of change from a reference tempo, and an intuitive word. Thus, the user can control the performance tempo of sounding music such as a ringing melody or BGM.

Still further, according to the invention associated with automatic composition, the portable terminal apparatus can selectively set an atmosphere of music to automatically create music information, or it allows the user to input part of music data so as to automatically create music information for a piece of music from the partial data.

According to the invention associated with pitch detection, when a pitch sequence is extracted from an input tone to crate music information, the portable terminal apparatus can arbitrarily select either a tone input from a microphone or a tone input during talking, or transpose the detected pitch sequence as required.

According to the invention associated with chord detection, the portable terminal apparatus can automatically create performance information associated with the chord fitting the music information.

According to the invention associated with style reproduction, the portable terminal apparatus can store plural kinds of style information and performance information and join them to reproduce a piece of music.

According to the invention associated with format conversion, the music tone information service system and the base station can convert at the base station (server) music information for other models or general-purpose music information incompatible with the first format into music information of the first format for its own model. Also, upon transmission of information associated with the terminal (identification information) from the terminal to the base station server, format conversion can be performed at the server on the basis of the information concerned. Further, the portable terminal apparatus can perform format conversion in its own terminal apparatus from music information for other models or general-purpose music information incompatible with the first format into music information of the first format for its own model.

According to the invention associated with trial listening, the music tone information service system and the base station can perform streaming transmission of information from the server to realize real-time trial listening on the portable terminal apparatus side.

According to the invention, the portable terminal apparatus is capable of mounting a detachable small-size recording medium; it can take in music information from the recording medium into the terminal system, or write music information from various information sources into the recording medium.

What is claimed is:

1. A music information processing apparatus capable of creating and editing music information representative of a music tone and transmitting the music information to a portable terminal apparatus having a capability of generating a music tone, the music information processing apparatus comprising:
   a creating and editing section that creates and edits music information;
   a compression section that compresses the music information; and
   a transmitting section that transmits the compressed music information to the portable terminal apparatus so that the portable terminal apparatus operates based on the transmitted music information to generate a music tone having a predetermined timbre.

2. The music information processing apparatus according to claim 1, further comprising a tone generating section that operates based on the compressed music information to generate a musical tone having a timbre specified by the compressed music information.

3. The music information processing apparatus according to claim 1, wherein the creating and editing section creates and edits music information having a plurality of timbre parameters for specifying a timbre, and the compression section compresses the music information by removing at least one timbre parameter.

4. The music information processing apparatus according to claim 1, wherein the creating and editing section creates and edits music information composed of a plurality of tracks, and the compression section compresses the music information by extracting a predetermined number of the tracks from the music information.

5. A portable terminal apparatus having a first capability of transmitting and receiving various information including music information, and a second capability of generating a desired music tone according to music information reserved in an information source in association to the first capability, the portable terminal apparatus comprising:
- a retrieving section that retrieves music information from the information source;
- a memory section that memorizes the retrieved music information;
- an editing section that edits the memorized music information by attaching timbre data to the music information for imparting a timbre to the music tone to be generated or by automatically compressing a data amount of the music information according to a predetermined compression rule; and
- a tone generating section that operates based on the edited music information to generate the music tone.

6. The portable terminal apparatus according to claim 5, wherein the retrieving section retrieves music information from the information source composed of a recording medium, which is attachable to the portable terminal apparatus.

7. The portable terminal apparatus according to claim 5, wherein the retrieving section retrieves music information from the information source composed of another portable terminal apparatus.

8. The portable terminal apparatus according to claim 7, further comprising a request information generating section that generates request information effective to request said another portable terminal apparatus to acquire the music information, and a request information transmitting section that transmits the generated request information to said another portable terminal apparatus, so that the retrieving section can retrieve the music information from the information source composed of said another portable terminal.

9. The portable terminal apparatus according to claim 7, further comprising a request information receiving section that receives request information from said another portable terminal apparatus, so that the retrieving section responds to the received request information to retrieve the music information from said another portable terminal.

10. The portable terminal apparatus according to claim 5, wherein the retrieving section retrieves music information from the information source composed of a base station.

11. The portable terminal apparatus according to claim 5, wherein the retrieving section retrieves music information from the information source composed of a personal computer.

12. A portable terminal apparatus having a main capability of transmitting and receiving various information, and a sub capability of generating a music tone represented by music information of a first format in association with the main capability, the portable terminal apparatus comprising:
- an acquiring section that acquires music information of a second format, which is invalid; and
- a converting section that converts the acquired music information from the second format to the first format, which is valid for generation of the music tone.

13. The portable terminal apparatus according to claim 12, further comprising a tone generator of a frequency modulation type for generating the music tone.

14. The portable terminal apparatus according to claim 13, wherein the tone generator is comprised of a digital signal processor operated by a microprogram to generate the music tone.

15. The portable terminal apparatus according to claim 13, wherein the tone generator is comprised of a central processing unit executing a software to generate the music tone.

16. The portable terminal apparatus according to claim 12, further comprising a tone generator having a wave-table memory storing a waveform of the music tone for generating the music tone.

17. The portable terminal apparatus according to claim 16, wherein the tone generator is comprised of a digital signal processor operated by a microprogram to generate the music tone.

18. The portable terminal apparatus according to claim 16, wherein the tone generator is comprised of a central processing unit executing a software to generate the music tone.

19. The portable terminal apparatus according to claim 12, further comprising a tone generator of a physical modeling type for generating the music tone.

20. The portable terminal apparatus according to claim 19, wherein the tone generator is comprised of a digital signal processor operated by a microprogram to generate the music tone.

21. The portable terminal apparatus according to claim 19, wherein the tone generator is comprised of a central processing unit executing a software to generate the music tone.

22. The portable terminal apparatus according to claim 12, further comprising a tone generator constituted by a digital signal processor for executing a microprogram to generate the music tone.

23. The portable terminal apparatus according to claim 12, further comprising a tone generator constituted by a central processing unit for executing a software to generate the music tone.

24. A base station for supporting a portable terminal having a main capability of transmitting and receiving various information and a sub capability of generating a music tone represented by music information of a first format in association with the main capability, the base station comprising:
- an information source that stores music information of a second format, which is invalid for the portable terminal;
- a converting section that converts the stored music information from the second format to the first format, which is valid for the portable terminal; and
- a transmitting section that transmits the converted music information of the first format to the portable terminal.

25. A base station for supporting a portable terminal having a main capability of transmitting and receiving various information and a sub capability of generating a music tone represented by music information of a predetermined format in association with the main capability, the base station comprising:
- a receiving section that receives identification information from the portable terminal for identifying the predetermined format valid in the portable terminal;
- a creating section that creates the music information of the predetermined format according to the received identification information; and
- a transmitting section that transmits the created music information of the predetermined format to the portable terminal.

26. A method of operating a music information processing apparatus capable of creating and editing music information representative of a music tone and transmitting the music information to a portable terminal apparatus having a capability of generating a music tone, the method comprising the steps of:
- creating and editing music information;

compressing the music information; and transmitting the compressed music information to the portable terminal apparatus so that the portable terminal apparatus operates based on the transmitted music information to generate a music tone having a predetermined timbre.

27. A method of operating a portable terminal apparatus having a first capability of transmitting and receiving various information including music information, and a second capability of generating a desired music tone according to music information reserved in an information source in association with the first capability, the method comprising the steps of:

retrieving music information from the information source;

operating a memory for memorizing the retrieved music information;

editing the memorized music information by attaching timbre data to the music information for imparting a timbre to the music tone to be generated or by automatically compressing a data amount of the music information according to a predetermined compressing rule; and operating a tone generator based on the edited music information to generate the music tone.

28. A method of operating a portable terminal apparatus having a main capability of transmitting and receiving various information, and a sub capability of generating a music tone represented by music information of a first format in association with the main capability, the method comprising the steps of:

acquiring music information of a second format, which is invalid; and converting the acquired music information from the second format to the first format, which is valid for generation of the music tone.

29. A method of operating a base station for supporting a portable terminal having a main capability of transmitting and receiving various information and a sub capability of generating a music tone represented by music information of a first format in association with the main capability, the method comprising the steps of:

operating an information source for storing music information of a second format, which is invalid for the portable terminal;

converting the stored music information from the second format to the first format, which is valid for the portable terminal; and transmitting the converted music information of the first format to the portable terminal.

30. A method of operating a base station for supporting a portable terminal having a main capability of transmitting and receiving various information and a sub capability of generating a music tone represented by music information of a predetermined format in association with the main capability, the method comprising the steps of:

receiving identification information from the portable terminal for identifying the predetermined format valid in the portable terminal;

creating the music information of the predetermined format according to the received identification information; and transmitting the created music information of the predetermined format to the portable terminal.

31. A machine readable medium for use in a music information processing apparatus having a processor and being capable of creating and editing music information representative of a music tone and transmitting the music information to a portable terminal apparatus having a capability of generating a music tone, the medium containing program instructions executable by the processor for causing the musical information processing apparatus to perform a method comprising the steps of:

creating and editing music information;

compressing the music information; and transmitting the compressed music information to the portable terminal apparatus so that the portable terminal apparatus operates based on the transmitted music information to generate a music tone having a predetermined timbre.

32. A machine readable medium for use in a portable terminal apparatus having a processor to provide a first capability of transmitting and receiving various information including music information, and a second capability of generating a desired music tone according to music information reserved in an information source in association with the first capability, the medium containing program instructions executable by the processor for causing the portable terminal apparatus to perform a method comprising the steps of:

retrieving music information from the information source;

operating a memory for memorizing the retrieved music information;

editing the memorized music information by attaching timbre data to the music information for imparting a timbre to the music tone to be generated or by automatically compressing a data amount of the music information according to a predetermined compression rule; and operating a tone generator based on the edited music information to generate the music tone.

33. A machine readable medium for use in a portable terminal apparatus having a processor to provide a main capability of transmitting and receiving various information, and a sub capability of generating a music tone represented by music information of a first format in association with the main capability, the medium containing program instructions executable by the processor for causing the portable terminal apparatus to perform a method comprising the steps of:

acquiring music information of a second format, which is invalid; and converting the acquired music information from the second format to the first format, which is valid for generation of the music tone.

34. A machine readable medium for use in a base station having a processor for supporting a portable terminal having a main capability of transmitting and receiving various information and a sub capability of generating a music tone represented by music information of a first format in association with the main capability, the medium containing program instructions executable by the processor for causing the base station to perform a method comprising the steps of:

operating an information source for storing music information of a second format, which is invalid for the portable terminal;

converting the stored music information from the second format to the first format, which is valid for the portable terminal; and transmitting the converted music information of the first format to the portable terminal.

35. A machine readable medium for use in a base station having a processor for supporting a portable terminal having a main capability of transmitting and receiving various information and a sub capability of generating a music tone represented by music information of a predetermined format in association with the main capability, the medium containing program instructions executable by the processor for causing the base station to perform a method comprising the steps of:

receiving identification information from the portable terminal for identifying the predetermined format valid in the portable terminal;

creating the music information of the predetermined format according to the received identification information; and transmitting the created music information of the predetermined format to the portable terminal.

* * * * *